(12) United States Patent
Hayashi et al.

(10) Patent No.: US 10,328,454 B2
(45) Date of Patent: Jun. 25, 2019

(54) METHOD FOR PRODUCING OPTICAL FILM

(71) Applicant: Konica Minolta, Inc., Chiyoda-ku, Tokyo (JP)

(72) Inventors: Kenji Hayashi, Tokyo (JP); Yoshiro Toda, Tokyo (JP); Takato Chiba, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 106 days.

(21) Appl. No.: 15/528,661

(22) PCT Filed: Nov. 19, 2015

(86) PCT No.: PCT/JP2015/082607
§ 371 (c)(1),
(2) Date: May 22, 2017

(87) PCT Pub. No.: WO2016/084718
PCT Pub. Date: Jun. 2, 2016

(65) Prior Publication Data
US 2017/0266689 A1 Sep. 21, 2017

(30) Foreign Application Priority Data
Nov. 26, 2014 (JP) .................................. 2014-239234

(51) Int. Cl.
*B32B 41/00* (2006.01)
*B05D 1/02* (2006.01)
(Continued)

(52) U.S. Cl.
CPC ................. *B05D 1/02* (2013.01); *B05D 1/28* (2013.01); *B05D 1/34* (2013.01); *B05D 1/40* (2013.01);
(Continued)

(58) Field of Classification Search
CPC ... B05D 1/02; B05D 1/40; B05D 1/28; B05D 1/34; B32B 27/30; B32B 23/08;
(Continued)

(56) References Cited

U.S. PATENT DOCUMENTS 5,212,981 A * 5/1993 Laun ..................... G01N 11/10
73/54.01

FOREIGN PATENT DOCUMENTS

JP 2009086659 A 4/2009

OTHER PUBLICATIONS

International Search Report corresponding to Application No. PCT/JP2015/082607; dated Mar. 15, 2016.

* cited by examiner

*Primary Examiner* — Michael N Orlando
*Assistant Examiner* — Joshel Rivera
(74) *Attorney, Agent, or Firm* — Cantor Colburn LLP

(57) ABSTRACT

Provided is a method for producing an optical film using simultaneous multilayer coating application, the method being capable of reducing the incidence of coating failure in an optical film. The present invention relates to a method for producing an optical film having at least two or more optical functional layers formed on a base material, the method including: a loss modulus checking step of checking the loss moduli of coating liquids capable of forming the respective optical functional layers by measuring dynamic viscoelasticity; and a coating application step of performing simultaneous multilayer coating application of the coating liquids capable of forming the respective optical functional layers on the base material.

9 Claims, 2 Drawing Sheets

(51) Int. Cl.
*B05D 1/34* (2006.01)
*G02B 5/26* (2006.01)
*G02B 5/28* (2006.01)
*B05D 1/28* (2006.01)
*B05D 1/40* (2006.01)
*B32B 23/08* (2006.01)
*B32B 23/22* (2006.01)
*B32B 27/18* (2006.01)
*B32B 27/30* (2006.01)
*G02B 1/10* (2015.01)
*G02B 5/08* (2006.01)
*G02B 1/111* (2015.01)

(52) U.S. Cl.
CPC .............. *B32B 23/08* (2013.01); *B32B 23/22* (2013.01); *B32B 27/18* (2013.01); *B32B 27/30* (2013.01); *G02B 1/10* (2013.01); *G02B 5/085* (2013.01); *G02B 5/26* (2013.01); *G02B 5/28* (2013.01); *G02B 1/111* (2013.01)

(58) Field of Classification Search
CPC ......... B32B 23/22; B32B 27/18; G02B 5/085; G02B 1/10; G02B 5/26; G02B 5/28; G02B 1/111
USPC ............................ 156/64, 350, 351, 378, 379
See application file for complete search history.

METHOD FOR PRODUCING OPTICAL FILM

This is the U.S. national stage of application No. PCT/JP2015/082607, filed Nov. 19, 2015. Priority under 35 U.S.C. § 119(a) and 35 U.S.C. § 365(b) is claimed from Japanese Application No. 2014-239324, filed Nov. 26, 2014, the disclosures of which are also incorporated herein by reference.

TECHNICAL FIELD

The present invention relates to a method for producing an optical film.

BACKGROUND ART

An optical film is a film capable of transmitting, reflecting, or absorbing light, and can exhibit optical functions such as refraction, birefringence, antireflection, viewing angle expansion, light diffusion, and luminance enhancement.

Optical films are used in flat panel displays (FPD) such as liquid crystal displays (LCD) and plasma displays (PDP), and in windowpanes for buildings and vehicles, as an infrared shielding film, an ultraviolet shielding film, an antireflective film, an oriented film, a polarizing film, a polarizing plate protective film, a retardation film, a viewing angle expansion film, a luminance improving film, an electromagnetic wave shielding film, and the like.

An example of the optical film may be a film in which at least two or more optical functional layers are formed and used. Regarding the optical film, for example, a film having a multilayer laminated film structure in which high refractive index layers and low refractive index layers are laminated on the surface of a base material, with the optical film thicknesses of the layers being respectively adjusted, is known. Such a film is known to selectively reflect light having a particular wavelength, and an optical film having a multilayer laminated film structure is used as an optical reflective film.

In an optical reflective film, the reflection wavelength can be controlled only by adjusting the film thicknesses or the refractive indices of respective layers. Thereby, the optical reflective film can selectively reflect infrared radiation, ultraviolet radiation, or visible light, as a result of the design according to the purpose of use of the film.

Above all, particularly, as the public interest on energy saving measures of recent years is ever increasing, from the viewpoint of reducing the load imposed on air-conditioning facilities, there is an increasing demand for an infrared shielding film that is attached on a windowpane of a building or a vehicle and blocks transmission of heat rays of sunlight.

Regarding a method for forming an infrared shielding film, methods of forming a laminated film having a configuration of alternately laminating high refractive index layers and low refractive index layers, using a dry film-forming method such as a vapor deposition method or a sputtering method, have been mainly proposed. However, in dry film-forming methods, the vacuum apparatuses and the like that are used for film formation need to become large-sized, the method requires high production cost, it is difficult to obtain a film having a large area, and the base material is limited to heat-resistant materials only.

In place of the dry film-forming methods having such problems as described above, a method of forming an infrared shielding film using a wet coating method is known (see, for example, JP 2009-86659 A).

Generally, methods for producing a laminated film having two or more layers on a base material by wet coating include sequential coating application of applying, drying, and laminating layer by layer; and simultaneous multilayer coating application of simultaneously applying a plurality of layers. Examples of sequential coating application include a spin coating method, a bar coating method, blade coating application, and gravure coating application; however, particularly in a case in which a multilayer film such as an optical reflective film is produced, since the number of times of coating application and drying processes becomes large, productivity is low. On the other hand, examples of simultaneous multilayer coating application include methods using curtain coating application and slide bead coating application, and since a plurality of layers can be formed, productivity is high. Therefore, simultaneous multilayer coating application is preferably employed.

SUMMARY OF INVENTION

Simultaneous multilayer coating application has an advantage that productivity is high, as described above. However, conventional methods have a problem that coating failure of the optical film thus produced easily occurs.

Therefore, an object of the present invention is to provide a production method of using simultaneous multilayer coating application, by which the incidence of coating failure of an optical film can be reduced.

Solution to Problem

The object of the present invention described above is solved by the following means.

That is, a method for producing an optical film having at least two or more optical functional layers formed on a base material, the method including: a loss modulus checking step of checking the loss moduli of coating liquids capable of forming the respective optical functional layers by measuring dynamic viscoelasticity; and a coating application step of performing simultaneous multilayer coating application of the coating liquids capable of forming the respective optical functional layers on the base material, wherein in the coating application step, coating application is performed when the time variations of the loss modulus ($\Delta G''$), as defined by the following Equation 1, of the coating liquids capable of forming the respective optical functional layers are 3.0 or less:

$$\Delta G''=G''(60)-G''(0) \qquad \text{(Equation 1)}$$

wherein $G''(60)$ represents the value of loss modulus at a measurement time of 60 minutes; and $G''(0)$ represents the value of loss modulus at a measurement time of 0 minutes.

BRIEF DESCRIPTION OF DRAWINGS

In FIG. 1, reference numeral 1 represents a stator tooth; 2 represents a rotor tooth; 4 and 5 each represent a shear object liquid (coating liquid capable of forming an optical functional layer); and La represents a gap.

In FIG. 2, reference numeral 11 represents a valve sheet; 12 represents a valve; 14 represents a shear object liquid (coating liquid capable of forming an optical functional layer); and Lb represents a gap.

In FIG. 3, reference numeral 101 represents a coating liquid preparing pot; 102, 105, and 109 each represent a liquid transporting apparatus; 103 and 108 each represent a filtering apparatus; 104 represents a coating liquid storing pot; 106 represents a dispersing apparatus; 107 represents a degassing apparatus; 114 represents a coating apparatus; 115 represents a setting apparatus; 116 represents a drying apparatus; 117 represents an optical film production system; L1 represents a route of supply; and R1 represents a route of circulation.

DESCRIPTION OF EMBODIMENTS

Figure 1:
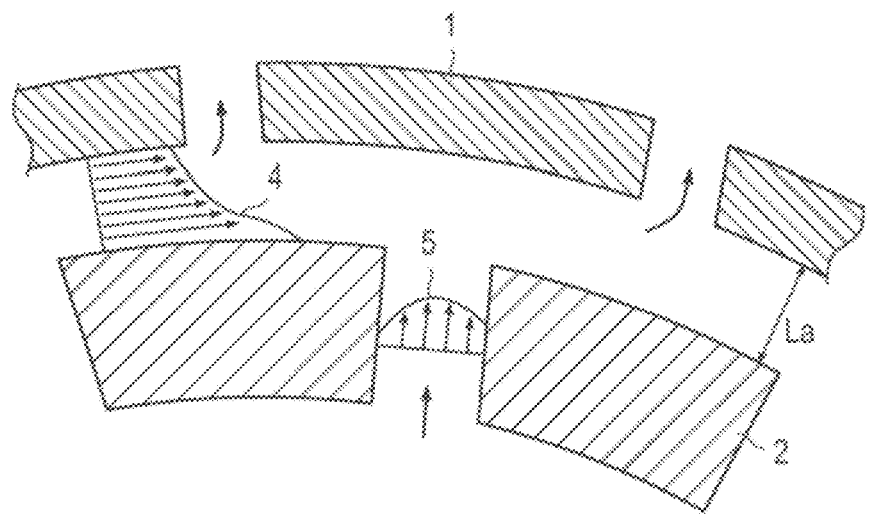
FIG. 1 is a schematic diagram illustrating an emulsifying disperser that can be used as an embodiment of the dispersing apparatus.

According to an aspect of the present invention, there is provided a method for producing an optical film having at least two or more optical functional layers formed on a base material, the method including: a loss modulus checking step of checking the loss moduli of coating liquids capable of forming the respective optical functional layers mentioned above, by measuring the dynamic viscoelasticity of the coating liquids; and a coating application step of performing simultaneous multilayer coating application of the coating liquids capable of forming the respective optical functional layers, on the base material, in which method coating application is performed in the coating application step when the time variations of the loss modulus ($\Delta G''$), as defined by the following Equation (1), of the coating liquids capable of forming the respective optical functional layers are 3.0 or less:

$$\Delta G'' = G''(60) - G''(0) \quad \text{(Equation 1)}$$

wherein $G''(60)$ represents the value of loss modulus at a measurement time of 60 minutes; and $G''(0)$ represents the value of loss modulus at a measurement time of 0 minutes.

When such a configuration is employed, there can be provided a production method by which the incidence of coating failure of an optical film using simultaneous multilayer coating application can be reduced.

The inventors of the present invention conducted a thorough investigation in order to solve the problem of the conventional methods involving coating failure of optical films.

During the process, the inventors found that an increase in the loss modulus ($G''$) of a coating liquid correlates with the film surface defects such as tailings and streaks, which constitute coating failure, and thus, the inventors paid attention to this point.

Here, the inventors of the present invention assumed that when aggregation of a coating liquid occurs in the gaps of the coater and on the film surface at the time of coating application, and the flow of the coating liquid partially changes due to the presence of the aggregates, consequently coating failure occurs. Furthermore, the inventors assumed that the extent of the incidence of aggregation in the coating liquid correlates with the value of the loss modulus ($G''$) of the coating liquid, so that the number of the aggregates increases, or the size of the aggregates increases, the value of loss modulus increases. In addition, the inventors assumed that aggregation occurs as a result of aggregation caused by intermolecular force, progress of chemical crosslinking caused by progress of a crosslinking reaction, progress of physical crosslinking caused by the occurrence of entanglement of polymer chains, and the like.

In this regard, attention has not been hitherto paid to the possibility that an increase in the loss modulus ($G''$) of a coating liquid may cause the occurrence of coating failure, and an optical film suppressed occurrence of coating failure could not be stably supplied.

Thus, the inventors of the present invention attempted to provide a loss modulus checking step of checking the loss moduli for the coating liquids used to form respective optical functional layers, by measuring the dynamic viscoelasticity after preparation of the coating liquids, and attempted to use coating liquids having a certain value or less for the time variation of the loss modulus in the coating application step.

The inventors found that when production is carried out as such, the occurrence of coating failure can be suppressed, and an optical film having excellent external appearance can be stably provided. Thus, the inventors completed the present invention.

Another aspect of the present invention relates to exhibition of more notable effects in the case of coating application for a long time period. In this regard, the inventors of the present invention speculate that it is because the effects of the present invention may be obtained more conspicuously since aggregation of the coating liquids can easily occur as time elapses.

The mechanism described in the present application, including the description given above, is based on speculations, and thus it should be noted that the right or wrong of the mechanism does not affect the technical scope of the present invention by any means.

In the following description, embodiments of the present invention will be explained. The present invention is not intended to be limited only to the following embodiments. Also, the dimensional ratios of the drawings may be exaggerated and differ from the actual ratios, for the convenience of explanation.

Furthermore, unless particularly stated otherwise, operations and measurement of physical properties are carried out under the conditions of room temperature (20° C. to 25° C.)/relative humidity of 40% RH to 50% RH.

In the following description, the method for producing an optical film of the present invention will be explained in detail.

[Method for Producing Optical Film]

In regard to the method for producing an optical film according to another aspect of the present invention, there are no particular limitations on the coating liquids capable of forming respective optical functional layers (in the present specification, also referred to as "coating liquids"), and commercially available coating liquids may be used, or coating liquids prepared in order to obtain desired characteristics as optical functional layers may also be used.

(Method for Preparing Coating Liquid)

In the following description, a method for preparing a coating liquid that is capable of forming an optical functional layer will be explained.

The method for preparing a coating liquid is not particularly limited, and a method of adding materials having desired functions and mixing and stirring the materials, may be employed. At this time, the order of addition of respective components is not particularly limited, and the respective components may be sequentially added while being stirred and then mixed, or the components may be added all at once while being stirred and then mixed. The coating liquid may be prepared to have an adequate viscosity using a solvent, if necessary.

In the following explanation, a method for producing an optical reflective film, particularly an infrared shielding film, which is formed by laminating refractive index layers having different refractive indices, will be primarily described; however, the subject matter of the present invention is not intended to be limited to this. Meanwhile, an optical reflective film corresponds to an optical film, and a refractive index layer corresponds to an optical functional layer.

The coating liquids that are used for simultaneous multilayer coating application are not particularly limited; however, for example, coating liquids that form a high refractive index layer and a low refractive index layer that constitute an optical reflective film (in the present specification, also simply referred to as "coating liquid for a high refractive index layer" and "coating liquid for a low refractive index layer") can be preferably used. Other examples of the coating liquid include a coating liquid for a medium refractive index layer having an intermediate refractive index between the high refractive index layer and the low refractive index layer; a coating liquid for a low viscosity slip layer intended for facilitating coating application; and a coating liquid having low surface tension that can be used for the topmost layer in order to suppress contraction flow of the coating liquid on a sliding surface.

It is preferable that the coating liquids for the respective refractive index layers include inorganic oxide particles, a polymer, a crosslinking component, other additives that are added as necessary, a solvent, and the like. In the present specification, a refractive index layer having a higher refractive index relative to the other refractive index layer is referred to as a high refractive index layer; and a refractive index layer having a lower refractive index relative to the other refractive index layer is referred to a low refractive index layer.

In the following description, the respective components that constitute a coating liquid will be described in detail.

(Crosslinking Component)

A preferred embodiment of the present invention relates to a method for producing an optical film, in which at least one of the coating liquids that form respective optical functional layers contains a crosslinking component.

A crosslinking component has a function of crosslinking the coating liquid constituent components.

When a coating liquid contains a crosslinking component, an unintended crosslinking reaction may proceed as time elapses. At this time, it is speculated that as the number or size of aggregates produced by crosslinking in the coating liquid respectively increases with the lapse of time, the loss modulus also increases with the lapse of time.

Thereby, in regard to a method for producing an optical film according to an embodiment of the present invention, in a case in which at least one of the coating liquids that form respective optical functional layers contains a crosslinking component, more notable effects of reducing the incidence of coating failure may be obtained.

Here, in a case in which a water-soluble polymer that will be described below is to be crosslinked by the crosslinking component, the refractive index layer can be imparted with water resistance. In the following description, a crosslinking component that crosslinks a polymer will be explained; however, the crosslinking component is not intended to be limited to this.

The crosslinking component that can be used is not particularly limited as long as it is capable of causing a crosslinking reaction with a polymer. In a case in which the polymer is an unmodified polyvinyl alcohol or a modified polyvinyl alcohol, for example, it is preferable to use boric acids and salts thereof (oxyacids having a boron atom as a central atom, and salts thereof), and more specifically, orthoboric acid, diboric acid, metaboric acid, tetraboric acid, pentaboric acid, octaboric acid, and salts thereof. Boric acids and salts thereof may be used singly or in combination of two or more kinds thereof.

Regarding the crosslinking component, other known compounds can also be used. The crosslinking component is generally a compound having a group capable of reacting with a polymer, or a compound that promotes a reaction between different groups carried by a resin, and the crosslinking component is appropriately selected and used according to the kind of the resin. Specific examples of the crosslinking component include, but are not particularly limited to, for example, epoxy-based crosslinking components such as diglycidyl ethyl ether, ethylene glycol diglycidyl ether, 1,4-butanediol diglycidyl ether, 1,6-diglycidylcyclohexane, N,N-diglycidyl-4-glycidyloxyaniline, sorbitol polyglycidyl ether, and glycerol polyglycidyl ether; aldehyde-based crosslinking components such as formaldehyde and glyoxal; active halogen-based crosslinking components such as 2,4-dichloro-4-hydroxy-1,3,5-S-triazine; active vinyl-based compounds such as 1,3,5-trisacryloylhexahydro-S-triazine and bisvinylsulfonyl methyl ether; and aluminum alum.

The concentration of the crosslinking component in the coating liquid is preferably 0.001% to 2% by mass in terms of the solid content. When the concentration of the crosslinking component is in the above-described range, the coating liquid has certain thread-forming properties or viscosity, and it is advantageous for film formation. Also, it is preferable from the viewpoint that the refractive index layer thus formed can have more suitable water resistance. When the concentration of the crosslinking component in the coating liquid is 0.001% to 1% by mass in terms of the solid content, the time variation of the loss modulus ($\Delta G''$) of the coating liquid can be made smaller, and therefore, it is more preferable. The concentration of the crosslinking component of the coating liquid is more preferably 0.01% to 1% by mass, and even more preferably 0.05% to 0.20% by mass.

It is preferable that the content of the crosslinking component in an optical functional layer is 0.02% to 20% by mass with respect to the total mass of the optical functional layer. When the content of the crosslinking component is in the above-described range, it is preferable from the viewpoint that the strength of the optical functional layer as a film can be sufficiently maintained. From the same point of view, the content of the crosslinking component in the optical functional layer is more preferably 0.2% to 10% by mass, and even more preferably 0.5% to 2% by mass.

Another preferred embodiment of the present invention is a method for producing an optical film, in which at least one of the coating liquids that form optical functional layers contains a polymer and inorganic oxide particles.

(Polymer)

There are no particular limitations on the polymer that can be used, and examples thereof include synthetic water-soluble polymers, including polyvinyl alcohols; polyvinylpyrrolidones; acrylic resins such as polyacrylic acid, an acrylic acid-acrylonitrile copolymer, a potassium acrylate-acrylonitrile copolymer, a vinyl acetate-acrylic acid ester copolymer, and an acrylic acid-acrylic acid ester copolymer; styrene-acrylic acid resins such as a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer; a styrene-sodium styrenesulfonate copolymer, a styrene-2-hydroxyethyl acrylate copolymer, a styrene-2-hydroxyethyl acrylate-potassium styrenesulfonate copolymer, a styrene-maleic acid copolymer, a styrene-maleic anhydride copolymer, a vinylnaphthalene-acrylic acid copolymer, a vinylnaphthalene-maleic acid copolymer; vinyl acetate-based copolymers such as a vinyl acetate-maleic acid ester copolymer, a vinyl acetate-crotonic acid copolymer, and a vinyl acetate-acrylic acid copolymer, and salts thereof; as well as natural water-soluble polymers such as gelatin and thickening polysaccharides.

Among these polymers, polyvinyl alcohol, polyvinylpyrrolidones and copolymers containing those, gelatin, and thickening polysaccharides (particularly, celluloses) are preferred from the viewpoints of handling at the time of production and flexibility of the film, and the polymer is more preferably polyvinyl alcohol from the viewpoint of optical characteristics. These polymers may be used singly, or two or more kinds thereof may be used in combination.

Regarding the polyvinyl alcohol that is used according to an embodiment of the present invention, a synthetic product may be used, or a commercially available product may also be used. There are no particular limitations on the commercially available products used as polyvinyl alcohol, and examples thereof include PVA-102, PVA-103, PVA-105, PVA-110, PVA-117, PVA-120, PVA-124, PVA-135, PVA-203, PVA-205, PVA-210, PVA-217, PVA-220, PVA-224, PVA-235, and PVA-617 (all manufactured by Kuraray Co., Ltd.); JC-25, JC-33, JF-03, JF-04, JF-05, JP-03, JP-04, JP-05, and JP-45 (all manufactured by Japan Vam & Poval Co., Ltd.).

Examples of polyvinyl alcohol that can be preferably used also include modified polyvinyl alcohols, in addition to conventional polyvinyl alcohol that is obtained by hydrolyzing polyvinyl acetate. There are no particular limitations on the modified polyvinyl alcohol, and examples thereof include a cationic-modified polyvinyl alcohol, an anionic-modified polyvinyl alcohol, a nonionic modified polyvinyl alcohol, and a vinyl alcohol-based polymer.

The average degree of polymerization of polyvinyl alcohol that is obtained by hydrolyzing vinyl acetate is preferably 100 or higher. When the average degree of polymerization in such a range, the polyvinyl alcohol acquires superior ability for being adsorbed to metal oxides, and there is an effect that dispersibility of metal oxides is further improved. From the same point of view, the average degree of polymerization is more preferably 200 to 5,000. Furthermore, in addition to the effect described above, from the viewpoint that the time variation of the loss modulus ($\Delta G''$) of the coating liquid can be further reduced, the average degree of polymerization is even more preferably 200 to 3,000. Here, the average degree of polymerization refers to viscosity average degree of polymerization, and this is measured according to JIS K6726: 1994.

The degree of saponification is preferably 70 mol % to 100 mol %. When the degree of saponification is in such a range, the polyvinyl alcohol has satisfactory solubility in water, and there is an effect that film defects after coating application are reduced. From the same point of view, the degree of saponification is more preferably 80 mol % to 99.5 mol %.

The cationic-modified polyvinyl alcohol is not particularly limited, and examples thereof include polyvinyl alcohols having a primary to tertiary amino group or a quaternary ammonium group in the main chain or a side chain of the polyvinyl alcohol, which are described in JP 61-10483 A. A cationic-modified polyvinyl alcohol is obtained by, for example, saponifying a copolymer of an ethylenically unsaturated monomer having a cationic group and vinyl acetate.

The anionic-modified polyvinyl alcohol is not particularly limited, and examples thereof include the polyvinyl alcohol having an anionic group as described in JP 1-206088 A; copolymers of vinyl alcohol and a vinyl compound having a water-soluble group as described in JP 61-237681 A, and JP 63-307979 A; and a modified polyvinyl alcohol having a water-soluble group as described in JP 7-285265 A.

The nonionic-modified polyvinyl alcohol is not particularly limited, and examples thereof include a polyvinyl alcohol derivative having a polyalkylene oxide group added to a portion of vinyl alcohol as described in JP 7-9758 A; a block copolymer of a vinyl compound having a hydrophobic group and vinyl alcohol as described in JP 8-25795 A; a silanol-modified polyvinyl alcohol having a silanol group; and a reactive group-modified polyvinyl alcohol having a reactive group such as an acetoacetyl group, a carbonyl group, or a carboxyl group. Further examples of vinyl alcohol-based polymers include EXCEVAL (trade name; manufactured by Kuraray Co., Ltd.) and NICHIGO G-POLYMER (trade name; manufactured by Nippon Synthetic Chemical Industry Co., Ltd.).

Regarding the polyvinyl alcohol, two or more kinds thereof having different degrees of polymerization or different kinds of modification can be used in combination. In a case in which two or more kinds of polyvinyl alcohols are used, the respective polyvinyl alcohols may be added separately.

The weight average molecular weight of the polymer is preferably from 1,000 to 200,000, and more preferably from 3,000 to 40,000. The weight average molecular weight can be measured, for example, using gel permeation chromatography (GPC) under the measurement conditions described below.

The concentration of the polymer in the coating liquid is preferably 0.9% to 10% by mass in terms of the solid content. When the concentration of the polymer is in the above-described range, the coating liquid acquires certain viscosity, and it is advantageous for film formation, which is preferable. From the same point of view, the concentration of the polymer is more preferably 1% to 8% by mass.

The content of the polymer in the optical functional layer is preferably 18% to 70% by mass with respect to the total mass of the optical functional layer. When the content of the polymer is in the above-described range, it is preferable from the viewpoint that the strength of the optical functional layer as a film can be sufficiently maintained. From the same point of view, the content of the polymer is more preferably 20% to 65% by mass.

(Inorganic Oxide Particles)

The inorganic oxide particles are not particularly limited, and examples thereof include inorganic oxides of one kind or two or more kinds selected from the group consisting of Li, Na, Mg, Al, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi, rare earth metals, and silicon (Si).

It is preferable for the inorganic oxide particles that the average particle size is 100 nm or less, 4 to 50 nm, or 4 to 30 nm, as listed in the order of preference. Here, the average particle size refers to the primary average particle size. Regarding the average particle size of the inorganic oxide particles, in a case in which the inorganic oxide particles have been coating-treated (for example, silica-attached titanium oxide), the average particle size of the inorganic oxide particles is intended to mean the average particle size of the parent material (in the case of silica-attached titanium oxide, titanium oxide before being treated).

In regard to the coating liquid for a low refractive index layer, it is preferable to use silicon oxide (silica, $SiO_2$) as the inorganic oxide particles. Here, examples of the silicon oxide include synthetic amorphous silica and colloidal silica. Meanwhile, colloidal silica can be obtained by heating and aging a silica sol obtainable by acid-induced metathesis of sodium silicate or by passing sodium silicate through an ion exchange resin layer. Such colloidal silica is not particularly limited, and for example, the colloidal silica products described in JP 57-14091 A, JP 60-219083 A, JP 60-219084 A, JP 61-20792 A, JP 61-188183 A, JP 63-17807 A, JP 4-93284 A, JP 5-278324 A, JP 6-92011 A, JP 6-183134 A, JP 6-297830 A, JP 7-81214 A, JP 7-101142 A, JP 7-179029 A, JP 7-137431 A, and WO 94/26530 A, can be used. Regarding such silicon oxide ($SiO_2$), a commercially available product may also be used. Commercially available colloidal silica is not particularly limited, and examples thereof include SNOWTEX (registered trademark) OXS (manufactured by Nissan Chemical Industries, Ltd.).

The inorganic oxide that is contained in the coating liquid for a high refractive index layer is not particularly limited, and examples thereof include particles and composite particles of titanium oxide, zinc oxide, aluminum oxide (alumina), zirconium oxide, hafnium oxide, niobium oxide, tantalum oxide, magnesium oxide, barium oxide, indium oxide, tin oxide, lead oxide; and complex oxides composed of these oxides, such as lithium niobate, potassium niobate, lithium tantalate, and aluminum magnesium oxide ($MgAl_2O_4$). Regarding the inorganic oxide, high refractive index inorganic oxide microparticles of titanium, zirconium oxide and the like, namely, titanium oxide microparticles or oxidized zirconia microparticles, are preferred from the viewpoint of forming a high refractive index layer that is transparent and has a higher refractive index, and rutile type (tetragonal system) titanium dioxide particles are more preferred.

Furthermore, the titanium oxide particles are not particularly limited, and for example, core-shell particles produced by known methods, such as titanium oxide particles obtained by modifying the surface of a water-based titanium oxide sol and stabilizing the dispersed state; or titanium oxide particles coated with a silicon-containing hydrous oxide as described in WO 2013/054912 A, may also be used. Examples of titanium oxide particles coated with a silicon-containing hydrous oxide include a silica-attached titanium dioxide sol obtained by attaching $SiO_2$ to the surface of rutile type titanium dioxide particles.

The concentration of the inorganic oxide particles in the coating liquid is not particularly limited; however, the concentration is preferably 1% to 15% by mass in terms of the solid content. When the content of the inorganic oxide particles in the coating liquid is 1% by mass or more, it is preferable from the viewpoint that a desired refractive index may be obtained more easily. When the content of the inorganic oxide particles in the coating liquid is 15% by mass or less, it is preferable from the viewpoint that flexibility of the film is enhanced, and the film-forming process is further facilitated. From the same point of view, the concentration is more preferably 2% to 10% by mass.

The content of the inorganic oxide particles in the optical functional layer is preferably 20% to 90% by mass with respect to the total mass of the optical functional layer. When the content of the inorganic oxide particles is in the above-described range, it is preferable from the viewpoint that the light reflection efficiency of the optical film is further enhanced. From the same point of view, the content is more preferably 35% to 80% by mass, and even more preferably 55% to 75% by mass.

(Other Additives)

There are no particular limitations on other additives, and examples thereof include various known additives such as an ultraviolet absorber; various anionic, cationic or nonionic surfactants; pH adjusting agents such as sulfuric acid, phosphoric acid, acetic acid, citric acid, sodium hydroxide, potassium hydroxide, and potassium carbonate; an antifoaming agent; a lubricating agent such as diethylene glycol; an antiseptic agent, an antifungal agent, an antistatic agent, a mattifying agent, an oxidation inhibitor, a flame retardant, an infrared absorber, a colorant, a pigment, an emulsion resin, a viscosity adjusting agent, and a thixotropy imparting agent. The amounts of addition of these additives can be appropriately determined by an ordinarily skilled person, and mixing thereof can also be carried out by referring to conventionally known information, or by proportionally blending the additives.

Here, citric acid can function as a pH adjusting agent. The concentration of citric acid in the coating liquid is preferably 0.01% to 2% by mass in terms of the solid content. When the concentration of citric acid is in the above-described range, it is preferable from the viewpoint that stability of polymers and metal oxides in the liquid is secured, and thus aggregation is suppressed. Furthermore, when the concentration of citric acid in the coating liquid is 0.01% to 1% by mass in terms of the solid content, it is particularly preferable because the time variation of the loss modulus ($\Delta G''$) of the coating liquid can be made smaller.

The concentration of surfactants in the coating liquid is preferably 0.005% to 0.3% by mass, and more preferably 0.005% to 0.1% by mass, in terms of the solid content.

(Solvent)

The solvent is not particularly limited, and examples thereof include water, an organic solvent, and a mixed solvent of water and an organic solvent. There are no particular limitations on the organic solvent, and examples thereof include alcohols such as methanol, ethanol, 2-propanol, and 1-butanol; esters such as ethyl acetate, butyl acetate, propylene glycol monomethyl ether acetate, and propylene glycol monoethyl ether acetate; ethers such as diethyl ether, propylene glycol monomethyl ether, and ethylene glycol monoethyl ether; amides such as dimethylformamide and N-methylpyrrolidone; and ketones such as acetone, methyl ethyl ketone, acetylacetone, and cyclohexanone. These organic solvents may be used singly, or as a mixture of two or more kinds thereof. From the viewpoints of environmental aspects, convenience of operation, and the like, it is preferable to use water, or a mixed solvent of water and methanol, ethanol or ethyl acetate, as the solvent for the coating liquid, and it is more preferably to use water.

(Loss Modulus Checking Step)

The method for producing an optical film according to an aspect of the present invention includes a loss modulus checking step of checking the loss moduli of the coating liquids capable of forming respective optical functional layers, by measuring the dynamic viscoelasticity.

The loss modulus checking step is a step of measuring the loss moduli of prepared coating liquids, and checking the time variations of the loss module ($\Delta G''$) defined by the following Equation (1).

$$\Delta G'' = G''(60) - G''(0) \qquad \text{(Equation 1)}$$

wherein G" (60) represents the value of loss modulus at a measurement time of 60 minutes; and G" (0) represents the value of loss modulus at a measurement time of 0 minutes.

In a coating liquid, there occurs variation in the loss modulus thereof with the lapse of time, and in regard to such a coating liquid, the frequency of incidence of coating failure increases along with an increase in the loss modulus with the lapse of time. Here, when the time variation of the loss modulus is checked in a short time from a measurement time of 60 minutes, in a comparison between a case in which coating failure occurs and a case in which coating failure does not occur, the difference between the measurement results of the two is small, and there is a possibility that the detection accuracy may be lowered. This is speculated to be because if the measurement time is short as described above, the number of aggregates causing coating failure at the time of coating application may be very small, or the size of the aggregates may be very small. Thus, in order to obtain sufficient detection accuracy, the measurement value at a measurement time of 60 minutes, at which a satisfactory correlation between the detection accuracy and coating failure, is used as an index of evaluation.

When the time variation of the loss modulus ($\Delta G"$), which is the difference between the loss moduli at the time of initiation of measurement (measurement time 0 minutes) and at a measurement time of 60 minutes, is 3.0 or less, the occurrence of planar defects such as tailings or streaks, which represent coating failure, is suppressed.

As a result of measuring the time variation of the loss modulus ($\Delta G"$), a coating liquid having a value of the time variation of 3.0 or less hardly undergo the occurrence of aggregation at a frequency that causes coating failure and the generation of aggregates having a size causing coating failure, in a time period shorter than 60 minutes. At this time, in regard to a general coating application step, it is speculated that when a coating liquid is discharged from a coater within a time period shorter than 60 minutes and reaches onto a film, coating failure is suppressed.

Therefore, if measurement is made in the loss modulus checking step, and as a result, the time variation of the loss modulus ($\Delta G"$) is greater than 3.0, it is necessary to adjust the time variation of the loss modulus ($\Delta G"$) of the coating liquid to be 3.0 or less in the loss modulus adjusting step that will be described below.

As such, a step of checking the time variation of the loss moduli ($\Delta G"$) of the coating liquids is carried out, and a step of adjusting the time variation of the loss moduli ($\Delta G"$) is further carried out as necessary, an optical film with suppressed coating failure can be supplied stably and reliably.

Here, the loss modulus (G") of a coating liquid can be measured by measuring dynamic viscoelasticity using a rheometer, for example, using the apparatus and conditions as described below.

Apparatus: RHEO STRESS 6000 (manufactured by Thermo Scientific, Inc.)
Sensor system: cone-plate (cone radius 60 mm, cone angle=1°)
Shear stress: 0.5 Pa
Measurement frequency: 1 Hz
Measurement time: 60 minutes
Measurement temperature: 35° C.
Sample amount: 1 mL Since determination of the time variation of the loss modulus ($\Delta G"$) requires a time period of 60 minutes, it is considered that at the time point where the value is calculated, the state of the coating liquid used for the measurement has been changed from the state upon measurement initiation. For example, it is thought that at the time of measurement initiation, a solution used for measurement is in a state in which the time variation of the loss modulus ($\Delta G"$) is 3.0 or less; however, after completion of measurement, the state may be changed such that the time variation of the loss modulus ($\Delta G"$) becomes more than 3.0.

Thus, in regard to the production of an optical film according to an aspect of the present invention, as the coating liquid for which the time variation of the loss modulus ($\Delta G"$) is 3.0 or less, a coating liquid for which the time variation of the loss modulus ($\Delta G"$) is assumed to be 3.0 or less can be used in the coating application step that will be described below. That is, in regard to the coating liquid that is to be applied in the coating application step described below, a solution in the same state as the coating liquid at the time of initiating the measurement of the time variation of the loss modulus ($\Delta G"$) can be prepared and used. Regarding such a coating liquid, apart from the coating liquid itself with which measurement of the time variation ($\Delta G"$) of the loss modulus has been performed, it is also acceptable to newly prepare a coating liquid that has the same formulation as that of the coating liquid with which measurement of the time variation of the loss modulus ($\Delta G"$) has been performed, and has been allowed to stand for a period of time equal to the time taken until the initiation of measurement of the time variation of the loss modulus ($\Delta G"$) after preparation of the coating liquid. In regard to a system in which the time variation of the loss modulus ($\Delta G"$) occurs due to a reversible change, a coating liquid with which measurement of the time variation of the loss modulus ($\Delta G"$) has been performed may also be used, if necessary, after having the time variation of the loss modulus ($\Delta G"$) adjusted to be 3.0 or less in the loss modulus adjusting step that will be described below.

The loss modulus checking step may be provided after being carried out in advance for the actual production of an optical film using a simulation liquid that has the same formulation as that of the coating liquid used for the production of an optical film and has been prepared so as to stand for a period of time equal to the time taken until the initiation of measurement of the time variation of the loss modulus ($\Delta G"$) after preparation of the coating liquid. In this case, since the coating liquid used for the production of an optical film is checked to find whether the time variation of the loss modulus ($\Delta G"$) is 3.0 or less, and in a case in which the time variation of the loss modulus ($\Delta G"$) is greater than 3.0, since the conditions needed to adjust the time variation to be 3.0 or less are estimated beforehand, it is not necessary to provide a loss modulus checking step using an actual coating liquid again for the actual production of an optical film.

When the time variation of the loss modulus ($\Delta G"$) is 3.0 or less, the coating liquid can be applied without having the loss modulus adjusting step that will be described below. However, even in a case in which the time variation of the loss modulus ($\Delta G"$) is 3.0 or less, it is preferable to adjust the time variation of the loss modulus ($\Delta G"$) to become even smaller in the loss modulus adjusting step, for the purpose of further ameliorating the incidence of coating failure.

From the viewpoint of further suppressing the occurrence of coating failure, the time variation of the loss modulus ($\Delta G"$) is preferably 2.0 or less, and more preferably 1.0 or less.

Furthermore, it is preferable that the time variation of the loss modulus ($\Delta G"$) is 0 or greater. The reason for this is as follows. In a case in which the time variation of the loss modulus ($\Delta G"$) is less than 0, there is a possibility that decomposition of the constituent components of the coating liquid may have occurred in the coating liquid. At this time, viscosity and the like of the coating liquid also become unstable with the lapse of time, and along with this, the control of the film thickness also becomes unstable. Thus, the film surface is likely to suffer unevenness.

(Loss Modulus Adjusting Step)

A preferred embodiment of the present invention is a method for producing an optical film, the method further including a loss modulus adjusting step between the loss modulus checking step and the coating application step that will be described below, the loss modulus adjusting step being intended to adjust at least a coating liquid having a time variation of the loss modulus ($\Delta G''$) of greater than 3.0 among the coating liquids capable of forming respective optical functional layers, such that the time variation of the loss modulus ($\Delta G''$) of the coating liquid is adjusted to be 3.0 or less by dispersing the coating liquid.

In regard to the loss modulus adjusting step, when the time variation of the loss modulus ($\Delta G''$) is found to be greater than 3.0 in the loss modulus checking step described above, the coating liquid is dispersed, and thereby the coating liquid whose loss modulus has been checked can be adjusted such that the time variation of the loss modulus ($\Delta G''$) would become 3.0 or less in the loss modulus checking step.

In a case in which the time variation of the loss modulus ($\Delta G''$) is greater than 3.0, the time variation of the loss modulus ($\Delta G''$) is usually decreased by performing a treatment of dispersing the coating liquid. The reason for this is that it is speculated that since a coating liquid having a time variation of the loss modulus ($\Delta G''$) of greater than 3.0 is in a state in which the frequency of the occurrence of aggregation is high, and the size of aggregates is large, the number of aggregates is decreased or the size of aggregates is decreased when redispersion of the coating liquid is performed.

Meanwhile, as described above in connection with the loss modulus checking step, it is contemplated that since determination of the time variation of the loss modulus ($\Delta G''$) requires a time period of 60 minutes, at the time point when the value has been calculated, the state of the coating liquid used for the measurement may have changed to a state different from the state of the coating liquid at the time of initiation of measurement.

Thus, in the case of providing the loss modulus adjusting step, a coating liquid that is estimated to have a time variation of the loss modulus ($\Delta G''$) of 3.0 or less can be used for the coating application step that will be described below, as the coating liquid having a time variation of the loss modulus ($\Delta G''$) of 3.0 or less. That is, regarding the coating liquid to be applied in the coating application step that will be described below, a solution in the same state as the state of the coating liquid at the time of initiation of measurement of the time variation of the loss modulus ($\Delta G''$) can be prepared and used. Regarding such a coating liquid, separately from the coating liquid itself with which the last measurement of the time variation of the loss modulus ($\Delta G''$) was performed (when it was confirmed that the time variation of the loss modulus ($\Delta G''$) was 3.0 or less), it is also acceptable to newly prepare a coating liquid having the same formulation as that of the coating liquid with which the measurement of the time variation of the loss modulus ($\Delta G''$) was performed, by performing the same treatment up to the time of initiating the last measurement of the time variation of the modulus ($\Delta G''$) after the adjustment of the coating liquid, and allowing the coating liquid to stand for the same length of time. Furthermore, in regard to a system in which the time variation of the loss modulus ($\Delta G''$) occurs due to a reversible change, it is also acceptable to use the coating liquid with which the last measurement of the dynamic viscoelasticity for the time variation of the loss modulus ($\Delta G''$) has been performed, if necessary, after adjusting the coating liquid again such that the time variation of the loss modulus ($\Delta G''$) becomes 3.0 or less in the loss modulus adjusting step.

Regarding the conditions for preparation employed in the loss modulus adjusting step, the conditions for preparation that have been figured out by using a simulation liquid having the same formulation as that of the coating liquid to be used for the production of an optical film, may be applied. That is, the conditions intended for adjusting the time variation of the loss modulus ($\Delta G''$) to be 3.0 or less, may be figured out beforehand for the actual production of an optical film, and those conditions may be applied. As such, when the conditions for preparation are estimated using a simulation liquid, and the value is applied, the operation of figuring out the conditions intended for adjusting the time variation of the loss modulus ($\Delta G''$) to be 3.0 or less, by repeatedly carrying out the loss modulus checking step and the loss modulus adjusting step using an actual coating liquid for the actual production of an optical film, may be omitted.

Furthermore, in regard to the loss modulus adjusting step, it is also possible to maintain the state of the coating liquid such that the time variation of the loss modulus ($\Delta G''$) does not exceed 3.0 or less, by repeatedly adjusting the coating liquid so as to make the time variation of the loss modulus ($\Delta G''$) of the coating liquid 3.0 or less. An example of such a method may be a method of subjecting a coating liquid that has been found to have a time variation of the loss modulus ($\Delta G''$) of greater than 3.0 in the initial loss modulus checking step, to an adjustment such that the time variation of the loss modulus ($\Delta G''$) becomes 3.0 or less in the loss modulus adjusting step, and subsequently conditioning the coating liquid in the loss modulus adjusting step again and again after the lapse of a certain period of time. Such a method can be carried out in, for example, an optical film production system having a circulation step that will be described below.

Here, the coating liquid that has been dispersed in the loss modulus adjusting step after the loss modulus checking step may be subjected, as necessary, to the measurement of the time variation of the loss modulus ($\Delta G''$) again in the loss modulus checking step.

Even in a case in which the time variation ($\Delta G''$) of the loss modulus is 3.0 or less, it is preferable to further adjust the time variation of the loss modulus ($\Delta G''$), for the purpose of further amelioration of coating failure. The preferred value of the time variation of the loss modulus ($\Delta G''$) and the reasons for this have been described above in the section for explaining the loss modulus checking step.

The coating liquid can be dispersed by subjecting the coating liquid to a shear treatment.

(Shear Treatment)

According to the present specification, the term "shear treatment" refers to any treatment for applying shear force. However, according to the present invention, a method of causing a shear object liquid (coating liquid capable of forming an optical functional layer) to move through a flow channel having a predetermined gap or the like at a predetermined velocity, and thereby applying shear force to the shear object liquid as such, can be used.

According to the present specification, the "shear velocity" is calculated by the following Equation (2).

Shear velocity (1/sec)=Velocity (m/sec)/minimum gap (m)  (Equation 2)

Here, the term "minimum gap" refers to the minimum gap to which shear force is applied, in the flow channel through which the shear object liquid moves. The term "velocity" refers to the velocity of movement of the shear object liquid obtainable when the shear object liquid passes through the above-mentioned minimum gap. At this time, in a case in which the shear object liquid is caused to move at a certain velocity, the highest shear force is applied when the shear object liquid passes through the minimum gap.

According to the present invention, there are no particular limitations on the shear treatment; however, for example, a shear treatment can be carried out using a dispersing machine, a high-speed stirring apparatus, a jetting apparatus, or a combination thereof.

There are also no particular limitations on the method of introducing a coating liquid into the apparatus mentioned above and the rate of introduction (flow rate); however, for example, the introduction can be conducted using a known means such as a rotary pump, and the rate of introduction (flow rate; L/min) can be appropriate changed in accordance with the scale of the apparatus.

In the following description, preferred embodiments of the respective apparatuses will be explained.

(Dispersing Apparatus)

The dispersing apparatus is not particularly limited; however, for example, an emulsifying disperser, a pressure type homogenizer, or a high-speed rotary shear type homogenizer can be used. The shear treatment in the case of using an emulsifying disperser and a pressure type homogenizer will be described below in detail.

FIG. 1 is a schematic diagram of an emulsifying disperser, which is one type of dispersing apparatus. The emulsifying disperser of FIG. 1 has stator teeth 1, which are static teeth, and rotor teeth 2, which are rotating teeth. A shear object liquid 4 that moves through the gap (shear gap) La between the stator teeth 1 and the rotor teeth 2 generates a velocity gradient (shear rate) in the direction of the radius of the rotor teeth 2. Due to this velocity gradient, an internal frictional force (shear force) is generated between the stator teeth 1 and the rotor teeth 2.

In FIG. 1, the shear gap La corresponds to the "minimum gap" in Equation 2, and the velocity of the shear object liquid 4 obtainable when the shear object liquid moves through the shear gap La, which is the minimum gap, corresponds to the "velocity" in Equation 2. Meanwhile, since introduction of the shear object liquid 5 into the shear gap La is achieved through the slit gap of the rotor teeth 2 in the direction of radius, the shear object liquid 4 flowing through the shear gap La and the shear object liquid 5 thus introduced continuously undergo repeated collisions. That is, when the emulsifying disperser of FIG. 1 is used, the shear object liquid is continuously subjected to shearing and mixing.

In regard to the emulsifying disperser, the minimum gap between a stator tooth and a rotor tooth at a shear gap is preferably 0.05 to 0.5 mm, and more preferably 0.1 to 0.4 mm. Furthermore, the speed of rotation of the rotor teeth is preferably 1 to 500 m/s, more preferably 3 to 300 m/s, and even more preferably 5 to 50 m/s. The shear velocity can be regulated by appropriately setting the minimum gap between a stator tooth and a rotor tooth at a shear gap, the speed of rotation of the rotor teeth, and the like.

Regarding the emulsifying disperser such as described above, for example, an EBARA MILDER (manufactured by Ebara Corp.) or a MILDER (manufactured by Pacific Machinery & Engineering Co., Ltd.) can be used.

Figure 2:
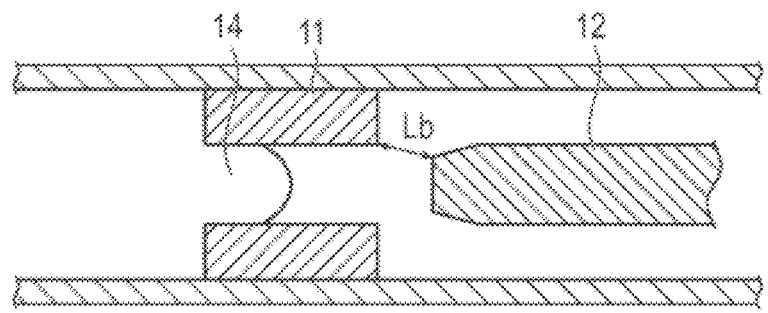
FIG. 2 is a schematic diagram illustrating a pressure type homogenizer that can be used as an embodiment of the dispersing apparatus.

FIG. 2 is a schematic diagram of a pressure type homogenizer, which is one type of dispersing apparatus. The pressure type homogenizer of FIG. 2 has a valve sheet 11 and a valve 12. A shear object liquid 14 that has been supplied by a pressurizing mechanism (not shown in the diagram) moves between the valve sheets 11 at a high velocity under high pressure. When this shear object liquid passes through a narrow gap Lb between the valve sheet 11 and the valve 12, friction between liquids occurs between the shear object liquid that has collided with the valve 12 and has the direction flow changed, and the shear object liquid that is about to pass through the gap Lb. As a result, it is considered that large shear force is applied to the shear object liquid. This shear force is properly proportional to the minimum gap Lb.

In regard to FIG. 2, the gap Lb is the minimum gap to which shear force is applied, and corresponds to the "minimum gap" in Equation 2. The velocity of the shear object liquid 14 obtainable when the shear object liquid moves through the gap Lb, which is the minimum gap, corresponds to the "velocity: in Equation 2.

In regard to the pressure type homogenizer, the distance between a valve sheet and a valve is preferably 0.05 to 0.5 mm, and more preferably 0.1 to 0.4 mm. The velocity of the shear object liquid when the liquid passes through between the valve sheet and the valve is preferably 1 to 500 m/s, more preferably 3 to 330 m/s, and even more preferably 5 to 300 m/s. The shear velocity can be regulated by appropriately setting the distance between the valve sheet and the valve, the supply conditions for the shear object liquid in a pressurizing mechanism, and the like.

Regarding the pressure type homogenizer such as described above, for example, a pressure type homogenizer LAB1000 (manufactured by SMT Co., Ltd.) can be used.

Meanwhile, a high-speed rotary shear type homogenizer is a treatment apparatus that has a configuration similar to that of an emulsifying disperser, and performs a shear treatment between a rotor that rotates at a high speed, and a stator disposed close thereto with a narrow gap therebetween.

Regarding the high-speed rotary shear type homogenizer, for example, a T.K. ROBOMIX (manufactured by Primix Corp.), a CLEARMIX CLM-0.8S (manufactured by M Technique Co., Ltd.), and a homogenizer (manufactured by Microtec Co., Ltd.) can be used.

The temperature for the shear treatment may vary depending on the value of the shear velocity and the type of the shear object liquid; however, the temperature is preferably 20° C. to 70° C., and the temperature is more preferably 25° C. to 60° C. from the viewpoints of the thermal load on the apparatus or the operational safety.

Regarding the method for controlling the time variation of the loss modulus ($\Delta G''$) using a dispersing apparatus, the conditions for rotation of the rotor of the dispersing apparatus may be appropriately set, or the retention time for the liquid in the dispersing machine may be appropriately set. When the number of rotations of the rotor of the dispersing apparatus is increased, the shear velocity increases, and the value of the loss modulus ($G''$) tends to become lowered. The reason for this is that it is speculated to be because stronger shear stress is applied to the coating liquid. At this time, the loss modulus ($G''$) of the coating liquid is such that since the effect of dispersion is strongly exhibited as the measurement time is longer, as described above, the time variation of the loss modulus ($\Delta G''$) tends to become lowered.

According to an embodiment of the present invention, it is preferable that the shear velocity applied to the shear object liquid when a shear treatment is performed is $0.1 \times 10^4$ (1/sec) or more. When the shear velocity is in such a range, the desired effects of the present invention can be provided efficiently. From the same point of view, the shear velocity is more preferably $0.5 \times 10^4$ to $1,000 \times 10^4$ (1/sec), even more preferably $1 \times 10^4$ to $200 \times 10^4$ (1/sec), and particularly preferably $1 \times 10^4$ to $20 \times 10^4$ (1/sec). However, according to another embodiment of the present invention, even if the shear velocity is less than $0.1 \times 10^4$ (1/sec), an optical film having a performance related to the effects of the present invention can be obtained.

Furthermore, when the rate of introduction of the coating liquid into the dispersing apparatus is decreased by decreasing the flow rate of a rotary pump or the like, the retention time for the coating liquid in the dispersing machine is increased, and the value of the loss modulus (G'') is decreased. The reason for this is that it is speculated to be because the shear treatment is carried out for a longer time. At this time, the loss modulus (G'') of the coating liquid is such that since the effect of dispersion is exhibited strongly as the measurement time is longer, as described above, the time variation of the loss modulus ($\Delta G''$) tends to become lowered.

The retention time represented by the following Equation 3, for which the coating liquid is retained in a vessel of a dispersing apparatus (dispersing vessel), is preferably 0.5 to 35 sec, more preferably 0.8 to 30 sec, even more preferably 1 to 30 sec, and particularly preferably 1 to 15 sec, from the viewpoint of dispersibility.

Retention time (sec)=Capacity of dispersing vessel (L)/pump flow rate (L/min)×60  (Equation 3)

(Coating Application Step)

In the method for producing an optical film according to an aspect of the present invention, at least two or more coating liquids capable of forming an optical functional layer and having a time variation of the loss modulus ($\Delta G''$) of 3.0 or less, are applied by simultaneous multilayer coating application on a base material in the coating application step.

From the viewpoint of suppressing further occurrence of coating failure, the time variation of the loss modulus ($\Delta G''$) is preferably 2.0 or less, and more preferably 1.0 or less.

Here, as described above, in a coating liquid, there occurs variation in the loss modulus thereof with the lapse of time, and in regard to such a coating liquid, the frequency of occurrence of coating failure increases along with an increase in the loss modulus with the lapse of time. Therefore, in regard to the coating application step, it is preferable that the time taken from the coating liquid state in which the time variation of the loss modulus ($\Delta G''$) is assumed to be 3.0 or less, to the state in which such a coating liquid is discharged from a coater and reaches to a film, is a short period of time. Such a time is preferably less than 60 minutes, more preferably 40 minutes or less, and even more preferably 30 minutes or less.

As described above, in the case of using a method of repeatedly adjusting the coating liquid so as to have a time variation of the loss modulus ($\Delta G''$) of 3.0 or less, and maintaining the state of the coating liquid such that the time variation of the loss modulus ($\Delta G''$) would not exceed 3.0 or less, the value of the time variation of the loss modulus ($\Delta G''$) of the coating liquid can be maintained to be less than or equal to a certain value. Thereby, the time taken from the coating liquid state in which the time variation of the loss modulus ($\Delta G''$) is 3.0 or less, to the state in which the coating liquid is discharged from a coater and reaches a film, can be regarded as the time only for supplying such a coating liquid from a storage pot (storage tank) that stores the coating liquid to the coating application step. Therefore, in a case in which such a method is used, the time taken by the coating liquid to be discharged from a coater and to reach a film can be shortened, and it is easier to make the variation of the loss modulus of the coating liquid small, which is preferable.

The method for applying a coating liquid capable of forming an optical functional layer is not particularly limited as long as a simultaneous multilayer coating application system is employed, and for example, a slide bead coating application method using the hoppers described in U.S. Pat. No. 2,761,419 B, 2,761,791 B and the like, or an extrusion coating method are preferably used.

Regarding the coating application and drying method in the case of performing simultaneous multilayer coating application, a method of heating coating liquids capable of forming respective optical functional layers to a temperature of 30° C. to 60° C., performing simultaneous multilayer coating application of the coating liquids capable of forming respective optical functional layers on a base material, subsequently first cooling the temperature of the coating films thus formed to a temperature of preferably 1° C. to 15° C. (setting), and then drying the coating films at or above 10° C., is preferred. More preferred drying conditions are conditions including a wet bulb temperature of 5° C. to 50° C. and a film surface temperature in the range of 10° C. to 50° C. For example, the coating films are dried by blowing warm air at 60° C. to 80° C. for 1 to 5 seconds. Also, regarding the cooling system immediately after coating application, it is preferable to perform cooling by a horizontal setting system, from the viewpoint of enhancing uniformity of the coating films thus formed.

According to the production method of an embodiment of the present aspect, the rate of coating application is preferably 10 m/min or higher, and more preferably 30 m/min or higher. According to the production method of the present invention, even with such a fast rate, a multilayer laminated film having enhanced uniformity of the film thickness and reduced interference unevenness can be obtained.

The respective optical functional layers may be applied so as to obtain preferred thicknesses upon drying.

The drying method is not particularly limited; however, for example, hot air drying, infrared drying, and microwave drying are used. Furthermore, drying in a multistage process is preferred to drying in a single process, and it is more preferable that the temperature of the constant rate drying part is set to be lower than the temperature of the lapse rate drying part. It is preferable that the temperature range of the constant rate drying part in this case is set to a range of 30° C. to 60° C., and it is preferable that the temperature range of the lapse rate drying part is set to a range of 50° to 100° C.

Here, the term setting means a process of increasing the viscosity of a coating film composition by means of lowering temperature by blowing cold air or the like to a coating film, and decreasing the fluidity of the substances between respective layers and within respective layers, or gelling the substances. A state in which when cold air is blown to a coating film on the surface, and then a finger is pressed on the surface of the coating film, nothing sticks to the finger, is defined as a setting completed state.

The time taken from the time point of coating application to the completion of setting by blowing cold air (setting time) is preferably within 5 minutes, and more preferably within 2 minutes. Furthermore, the lower limit of the time is not particularly limited; however, it is preferable to take a time of 10 seconds or longer. If the setting time is too short, there is a high possibility that mixing of the components in the layer may occur to an insufficient extent. On the other hand, if the setting time is too long, there is a high possibility that interlayer diffusion of the layer-forming components may proceed, and the function manifesting characteristics of the respective optical functional layers may become insufficient. For example, in a case in which an optical functional layer has a structure in which high refractive index layers and low refractive index layers are alternately laminated, there is a high possibility that the difference between the refractive indices may be insufficient.

(Base Material)

The base material that is applied to an optical film is not particularly limited as long as it is transparent, and any known resin film can be used. Specific examples of the base material are not particularly limited, but examples thereof include polyethylene (PE), polypropylene (PP), polystyrene (PS), polyallylate, polymethyl methacrylate, polyamide, polycarbonate (PC), polyethylene terephthalate (PET), polybutyleneterephthalate (PBT), polyethylene naphthalate (PEN), polysulfone, polyether sulfone, polyether ether ketone, polyimide, aromatic polyimide, and polyetherimide. Among these, from the viewpoints of cost and easy availability, it is preferable to use polyethylene terephthalate (PET), polyethylene naphthalate (PEN), polycarbonate (PC), or the like.

A base material using the above-mentioned resin film may be an unstretched film, or may be a stretched film. In a case in which the base material is a resin film having crystallinity, such as PET or PEN, it is preferable that the base material is a film that has been thermally fixed after stretching, from the viewpoint of enhancing strength and suppressing thermal expansion.

The thickness of the base material is preferably 5 to 300 μm, more preferably 15 to 150 μm, and even more preferably 30 to 100 μm. Furthermore, the base material may be a product obtained by stacking two or more sheets, and at this time, the types of the base materials may be the same, or may be different from each other.

The base material may be provided with an undercoat layer on one surface or on both surfaces during the film-forming process. This undercoat layer can be formed in-line or after film forming. Regarding the method for forming an undercoat layer, for example, a method of applying an undercoat layer coating liquid and drying a coating film thus obtained, may be employed. Regarding the undercoat layer, a known layer can be used, and the undercoat layer may have a single layer structure, or a laminated structure.

The base material may further have a known functional layer such as a conductive layer, an antistatic layer, a gas barrier layer, an easily adhesive layer (adhesive layer), an antifouling layer, a deodorizing layer, an anti-sticking layer, a lubricating layer, a hard coat layer, a wear-resistant layer, a pressure-sensitive adhesive layer, or an intermediate film layer. It is also acceptable that these functional layers are formed on both surfaces of the base material.

In a case in which the base material has an intermediate layer such as the above-mentioned undercoat layer or a functional layer, the total film thickness of the base material and the intermediate layer is preferably 5 to 500 μm, more preferably 25 to 250 μm, and even more preferably 30 to 100 μm.

[Optical Film Production System]

Next, a suitable example of the production system used for the production method according to an embodiment of the present invention will be described. However, the production method of the present invention is not intended to be limited to the case of using such a production system.

Figure 3:
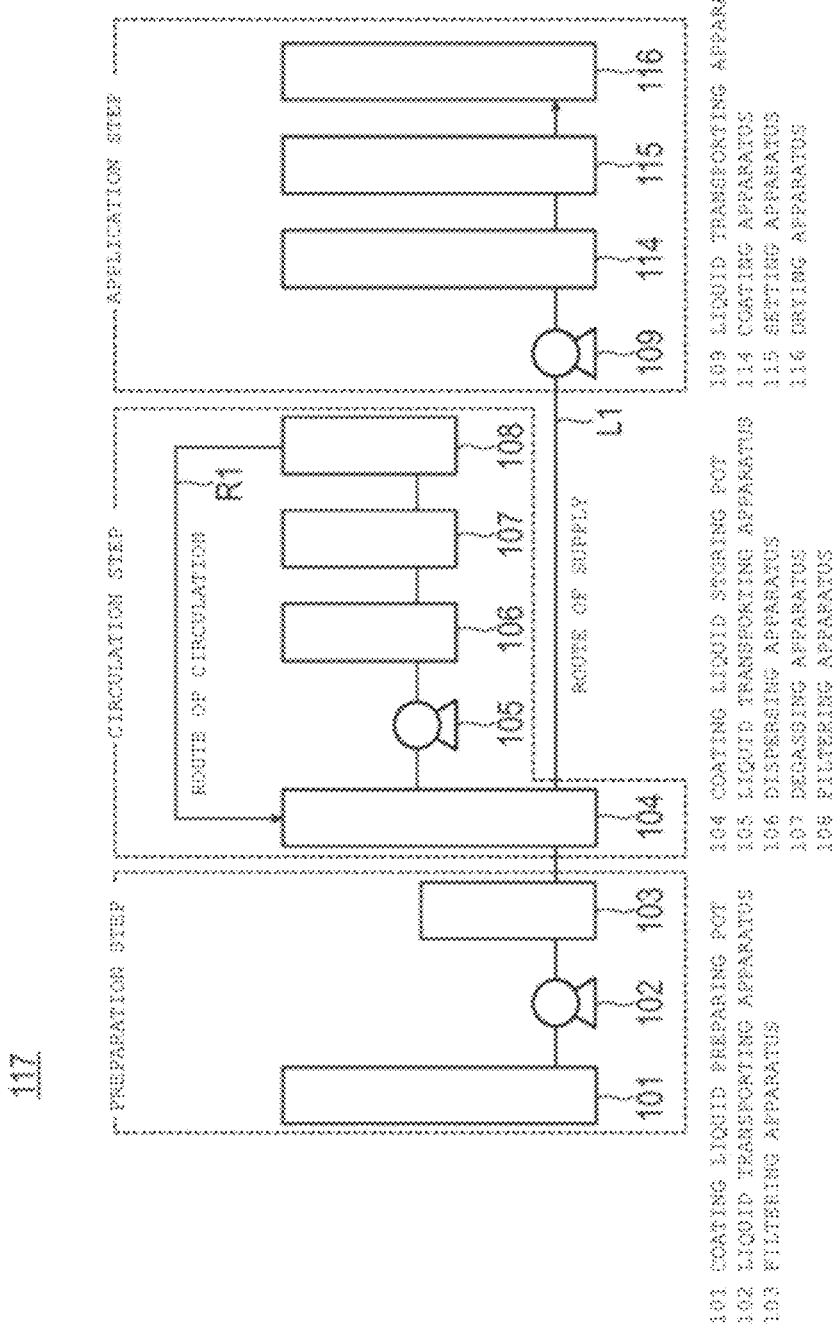
FIG. 3 is a schematic configuration diagram illustrating an optical film production system that can be used as an embodiment.

FIG. 3 is a schematic configuration diagram illustrating an example of an optical film production system that can be used for the production method according to an embodiment of the present invention.

The optical film production system 117 illustrated in FIG. 3 is configured to include a plurality of apparatuses connected together, and produces an optical film through a plurality of processes that are realized by the respective apparatuses. In the example illustrated in FIG. 3, the optical film production system 117 implements, as broadly divided sections, a preparation step, a circulation step, and a coating application step.

In the optical film production system 117, coating liquids that form optical functional layers of an optical film are prepared in the preparation step.

(Preparation Step)

The preparation step includes a coating liquid preparing pot 101, a liquid transporting apparatus 102, and a filtering apparatus 103.

The coating liquid preparing pot 101 is a vessel for producing a coating liquid. The method for preparing a coating liquid is not particularly limited, and is a method of adding the components that form an optical functional layer, for example, a water-soluble polymer, metal oxide particles and a crosslinking component, to a solvent, and mixing and stirring the mixture. At this time, the order of addition of the respective components is not particularly limited, and the respective components may be sequentially added and mixed while being stirred, or the respective components may be added all at once while being stirred and then mixed. Such a method for preparing a coating liquid can be appropriately determined for each coating liquid. The coating liquid preparing pot 101 is connected to a coating liquid storing pot 104, so that the coating liquid can be supplied to the coating liquid storing pot 104 that is included in the circulation step.

The liquid transporting apparatus 102 is provided on the route of discharging the coating liquid from the coating liquid preparing pot 101. The liquid transporting apparatus 102 is, for example, a pump, and is capable of controlling the outflow and the suspension of outflow of the coating liquid thus prepared. In the liquid transporting apparatus 102, the flow rate or velocity of the coating liquid can be appropriately set when the coating liquid is discharged.

The filtering apparatus 103 is provided on the route of discharging the coating liquid from the coating liquid preparing pot 101. The filtering apparatus 103 removes foreign materials mixed in the coating liquid, or gas bubbles or foreign materials caused by aggregation that have been generated in the coating liquid. The coating liquid from which foreign materials have been removed is set to the circulation step.

(Circulation Step)

In the optical film production system 117, the coating liquid thus prepared is circulated while having the time variation of the loss modulus ($\Delta G''$) maintained at an appropriate value, in the circulation step (coating liquid circulation system). The circulation step includes a coating liquid storing pot 104, a liquid transporting apparatus 105, a dispersing apparatus, 106, a degassing apparatus 107, a filtering apparatus 108, and a route of circulation R1.

In regard to the optical film production system 117, the loss modulus checking step may be included in the circulation step. Furthermore, if necessary, the loss modulus adjusting step may also be included in the circulation step. The loss modulus checking step can be realized by sampling the coating liquid from the coating liquid storing pot 104, and measuring the loss modulus (G"). The sampling position may be any other position as long as the purpose of the present invention is achieved, and the position is upstream of the coating application step. The loss modulus adjusting step can be realized by dispersing the coating liquid using the dispersing apparatus 106, and checking the loss modulus (G") of the coating liquid.

The coating liquid storing pot 104 stores the coating liquid so that the coating liquid can be continuously supplied. It is preferable that the coating liquid storing pot 104 includes a stirring apparatus for circulating the coating liquid even in the interior of the coating liquid storing pot 104. Thereby, the physical properties of the coating liquid inside the coating liquid storing pot 104 can be made uniform. The coating liquid storing pot 104 is connected to a route of circulation R1 for discharging the coating liquid from the coating liquid storing pot 104, and returning the discharged coating liquid again to the coating liquid storing pot 104. Furthermore, the coating liquid storing pot 104 is also connected to a route of supply L1 for sending the coating liquid to the coating application step.

The liquid transporting apparatus 105 is provided on the route of circulation R1. The liquid transporting apparatus 105 is, for example, a pump, and is capable of controlling the outflow and the suspension of outflow of the coating liquid stored in the coating liquid storing pot 104. In the liquid transporting apparatus 105, the flow rate or velocity of the coating liquid can be appropriately set when the coating liquid is discharged.

The dispersing apparatus 106 is provided on the route of circulation R1. The dispersing apparatus 106, if necessary, can perform, a dispersion treatment, suitably a dispersion treatment by means of shear force, on the coating liquid. Through such a dispersion treatment, for example, the value of the time variation of the loss modulus (ΔG") of a coating liquid whose value of the time variation of the loss modulus (ΔG") is greater than 3.0, can be reduced and adjusted to a desired value. Regarding the dispersing apparatus, those mentioned above can be used.

The degassing apparatus 107 removes gas bubbles included in the coating liquid or dissolved air that is dissolved in the coating liquid. Regarding the principle of degassing, separating gas bubbles and a liquid by centrifugal force, and then discharging the gas bubbles by drawing a vacuum may be considered, or utilizing ultrasonic waves may be considered. However, as long as degassing can be achieved, the degassing apparatus 107 may be any apparatus that utilizes any other principle.

The filtering apparatus 108 removes foreign materials mixed in the coating liquid, or gas bubbles or foreign materials caused by aggregation that have been generated in the coating liquid. The coating liquid from which foreign materials have been removed is returned to the coating liquid storing pot 104 via the route of circulation R1.

As described above, in the circulation step, the coating liquid is discharged from the coating liquid storing pot 104 to the route of circulation R1, is subjected to treatments by the dispersing apparatus 106, the degassing apparatus 107 and the filtering apparatus 108, and then is returned to the coating liquid storing pot 104. It is also acceptable that the coating liquid that has returned to the coating liquid storing pot 104 is moved while being stirred within the coating liquid storing pot 104, subsequently discharged again to the route of circulation R1, and then repeatedly subjected to the above-described treatments.

The treatment intensities of the dispersing apparatus 106, the degassing apparatus 107, and the filtering apparatus 108 in the circulation step can be appropriately set according to the conditions such as the use of the optical film or the properties of the coating liquid used, such that the physical properties of the coating liquid can be maintained within adequate ranges.

In regard to the circulation step, when the coating liquid thus prepared is continuously subjected to a dispersion treatment, a degassing treatment, a filtering treatment and the like at appropriate intensities while the coating liquid is circulated, the value of the time variation of the loss modulus (ΔG") of the coating liquid can be adjusted to be within an appropriate range.

Meanwhile, the coating liquid at a predetermined flow rate per a certain time is sequentially sent from the coating liquid storing pot 104 to the route of circulation R1 and is circulated, according to the settings of the liquid transporting apparatus 105 and the like. Since the coating liquid thus circulated is returned to the coating liquid storing pot 104 and stirred, the physical properties of the coating liquid as a whole accommodated in the coating liquid storing pot 104 can be always maintained in a state appropriate for coating application. At this time, it is preferable to set the system such that the coating liquid passes through the route of circulation two or more times, from the viewpoint that the value of the time variation of the loss modulus (ΔG") of the coating liquid can be easily adjusted within an appropriate range. Here, as for the number of times of passage through the route of circulation, when the volume of the coating liquid storing pot 104 is designated as A (L), and the speed of liquid transport is designated as B (L/min), the work of A/B (min) is conveniently counted as one time. When the number of times of passage is employed, the value of the time variation of the loss modulus (ΔG") of the coating liquid is stabilized, and the value of the time variation of the loss modulus (ΔG") of the coating liquid can be easily adjusted to be 3.0 or less.

The coating liquid accommodated in the coating liquid storing pot 104 can be sent to the coating application step through the route of supply L1 connected to the coating liquid storing pot 104. In a case in which the time variation of the loss modulus (ΔG") of the coating liquid is 3.0 or less, and it is no longer necessary for the coating liquid to go through the loss modulus adjusting step, the coating liquid can be sent to the coating application step via the route of supply L1. In this case, the coating liquid may also be transported to the coating application step from the coating liquid storing pot 104 through the route of supply L1, without passing through the route of circulation in the circulation step.

In FIG. 3, apparatuses are arranged on the route of circulation R1 in the order of the dispersing apparatus 106, the degassing apparatus 107, and the filtering apparatus 108. However, the order of these apparatuses can be appropriately modified. Furthermore, one apparatus having a unified function of a plurality of the above-described apparatuses may also be provided to the circulation step. For example, a dispersion degassing apparatus having a unified function of the dispersing apparatus 106 and the degassing apparatus 107 may be provided to the circulation step. Furthermore, in the circulation step, apparatuses other than those mentioned above may be provided, or any one of the above-mentioned apparatuses may not be provided.

Regarding the method for managing the time variation of the loss modulus ($\Delta G''$) in the optical film production system, there may be mentioned a method of sampling the coating liquid before the coating application step, measuring the time variation of the loss modulus ($\Delta G''$) of the coating liquid, and in a case in which the time variation of the loss modulus ($\Delta G''$) of the coating liquid is 3.0 or less, advancing to the coating application step, which is the subsequent step, or in a case in which the time variation of the loss modulus ($\Delta G''$) of the coating liquid is greater than 3.0, performing a treatment of adjusting the time variation of the loss modulus ($\Delta G''$) of the coating liquid again. The management of the time variation of the loss modulus ($\Delta G''$) of the coating liquid may be achieved by manual operation, or may be achieved using a management system using a control device. Regarding the management system using a control device, for example, a configuration in which the circulation step of the optical film production system 117 further includes a measuring device and a control device, may be mentioned. The present configuration may be a configuration in which, for example, a measuring device is provided on the route of circulation R1, measures the physical properties of the coating liquid that passes through the route of circulation R1, and notifies the information presenting the results of measurement to the control device; and the control device can control the liquid transporting apparatus 105 and the dispersing apparatus 106 based on the information presenting the measurement results notified from the measuring device.

Repetition of the circulation step is appropriately set such that the time variation of the loss modulus ($\Delta G''$) of the coating liquid in the coating application step becomes 3.0 or less; however, it is preferable that the circulation step is repeated two or more times. As the circulation step is repeatedly carried out again and again, the time variation of the loss modulus ($\Delta G''$) tends to decrease. Therefore, although the upper limit of the number of repetitions is not particularly limited, the number of repetitions is preferably 4 times or less, when saturation of the effects and productivity are considered. The flow rate of the coating liquid in the circulation step is preferably 5 L/min or more, from the viewpoint of the amount of liquid storage.

(Coating Application Step)

Next, the coating liquid thus prepared and circulated is supplied to a coating apparatus by the liquid transporting apparatus 109, via the route of supply L1.

The liquid transporting apparatus 109 transports the coating liquid discharged from the coating liquid storing pot 104 of the circulation step, to the respective apparatuses provided on the route of supply L1. The liquid transporting apparatus 109 is, for example, a pump, and is capable of controlling the outflow and the suspension of outflow of the coating liquid thus prepared. In the liquid transporting apparatus 109, the flow rate or velocity of the coating liquid can be appropriately set when the coating liquid is discharged.

In the optical film production system 117, a coating liquid is applied on a base material, and a polymer film is produced, in the coating application step. The coating application step includes a coating apparatus 114, a setting apparatus 115, and a drying apparatus 116.

The coating apparatus 114 applies a coating liquid on a base material. In a case in which coating liquids are applied on a base material by laminating them into a plurality of layers (so-called multilayer coating application), at least the coating liquids that are adjacently superposed should be prepared using different allocations or materials. Therefore, in FIG. 3, an embodiment of the optical film production system 117 having one coating liquid preparing pot 101 is illustrated; however, it is preferable that the optical film production system has at least two or more coating liquid preparing pots. Thus, in regard to such a production system, an embodiment in which multiple kinds of coating liquids go through separate preparation steps and supply steps and are supplied to the coating apparatus 114, is preferred.

In regard to the coating application step, it is preferable that the coating liquids are applied on a base material that is continuously conveyed.

As described above, when the optical film production system 117 is used, a dispersion treatment can be continuously added by circulating coating liquids. Therefore, a coating liquid whose value of time variation of the loss modulus ($\Delta G''$) changes with the lapse of time or the like, can be continuously supplied stably in a state appropriate for uniform coating application.

Furthermore, according to an embodiment of the present invention, it has been described such that the optical film production system 117 is provided with one circulation step; however, the invention is not limited to this. The optical film production system 117 may be provided with a plurality of circulation steps.

In regard to the optical film production system 117, the route of circulation R1 and the route of supply L1 are respectively connected to the coating liquid storing pot 104 of the circulation step as separate routes, and a liquid transporting apparatus, a dispersing apparatus and the like are provided on each of the routes. However, the route of circulation R1 and the route of supply L1 may share some part of the route or apparatuses, and facilities provided on the route of the other side may be omitted. That is, an optical film production system in which the route of supply L1 is be connected in the middle of the route of circulation R1, and parts of the route or apparatuses on the route of supply L1 have been omitted, may also be employed.

[Optical Film]

The structure of the optical film produced according to the production method of the present invention is not particularly limited, as long as it is a structure in which at least two or more optical functional layers have been formed on a base material.

A preferred embodiment of the present invention is a method for producing an optical film having a structure in which respective optical functional layers of the optical film include a high refractive index layer and a low refractive index layer, and high refractive index layers and low refractive index layers are alternately laminated. Meanwhile, in the present specification, a refractive index layer having a higher refractive index relative to the other is referred to as a high refractive index layer, and a refractive index layer having a lower refractive index relative to the other is referred to as a low refractive index layer.

Regarding an optical film having such a configuration, for example, an optical reflective film may be mentioned.

A preferred embodiment of the present invention is a production method in which the optical film is an optical reflective film.

Furthermore, a more preferred embodiment of the present invention is a production method in which the optical reflective film is an infrared shielding film.

An optical reflective film has such a configuration, and can reflect light rays having a particular wavelength by appropriately controlling the optical film thicknesses of the high refractive index layer and the low refractive index layer (film thickness×refractive index). Thereby, the optical reflective film may serve, for example, as an ultraviolet shielding film in the case of reflecting light rays having a wavelength of 200 to 400 nm (ultraviolet radiation); serves as a visible colored film in the case of reflecting light rays having a wavelength of 400 to 700 nm (visible light); and serves as an infrared shielding film in the case of reflecting light rays having a wavelength of 700 to 1,200 nm (infrared radiation). In addition to that, the optical reflective film can also be produced into a metallic luster tone film by appropriately designing the optical film thickness and the like of the laminate, and thereby controlling the wavelength of the light rays to be reflected and the reflectance. Among these, the light rays that can be shielded by the optical reflective film are preferably light rays in the ultraviolet to infrared region with the wavelength range of 200 nm to 1,000 μm, more preferably light rays having a wavelength of 250 to 2,500 nm, and even more preferably light rays in the near-infrared region having a wavelength of 700 to 1,200 nm.

Generally, in regard to the optical reflective film, it is preferable that the film is designed so as to have a large difference between the refractive indices of the low refractive index layer and the high refractive index layer, from the viewpoint that the reflectance for a desired wavelength region can be increased with a smaller number of layers. In the optical reflective film according to the present invention, for at least one unit composed of a low refractive index layer and a high refractive index layer, it is preferable that the difference in the refractive index between a low refractive index layer and a high refractive index layer that are adjacent to each other is 0.1 or greater, more preferably 0.3 or greater, even more preferably 0.35 or greater, and particularly preferably 0.4 or greater. In a case in which the optical reflective film has a plurality of units composed of a high refractive index layer and a low refractive index layer, it is preferable that the difference in the refractive index between the high refractive index layer and the low refractive index layer in all of the units is within the suitable range mentioned above. However, the structure of the optical reflective film is not limited to this, and the structure may also be configured such that, for example, the outermost layer or the bottommost layer have a value that is out of the suitable range mentioned above.

As explained above, whether a refractive index layer is a high refractive index layer or a low refractive index layer is a relative matter that is determined based on the relation with the adjacent refractive index layer; however, the refractive index of the high refractive index layer (nH) is preferably 1.60 to 2.50, more preferably 1.70 to 2.50, even more preferably 1.80 to 2.20, and particularly preferably 1.90 to 2.20. On the other hand, the refractive index of the low refractive index layer (nL) is preferably 1.10 to 1.60, more preferably 1.30 to 1.55, and even more preferably 1.30 to 1.50.

According to the present invention, the refractive indices of the high refractive index layer and the low refractive index layer can be determined by, for example, the method described below.

A sample is produced by providing a refractive index layer, for which the refractive index should be measured, on a base material by coating in a single layer, and this sample is cut out into a size of 10 cm×10 cm. Subsequently, the refractive index is determined by the following method. The back surface from the measurement side of each sample is treated by surface roughening, and then is subjected to a light absorption treatment with a black spray so as to prevent reflection of light at the back surface. The reflectance for the visible light region (400 nm to 700 nm) is measured at 25 points under the conditions of 5° regular reflection using a spectrophotometer, U-4000 type (manufactured by Hitachi, Ltd.), and the average value is determined. Thus, the average refractive index is determined from the measurement results.

The reflectance in a particular wavelength region is determined by the difference between the refractive indices of adjacent two layers and the number of laminated layers, and as the difference between the refractive indices is larger, the same reflectance can be obtained with a smaller number of layers. This difference in the refractive index and the necessary number of layers can be calculated using a commercially available optical design software program. For example, in a case in which the optical reflective film is an infrared shielding film, in order to obtain an infrared reflectance of 90% or higher, if the difference in the refractive index is smaller than 0.1, lamination of more than 100 layers is needed. Thus, not only productivity is lowered, but also scattering at the laminated interfaces increases, transparency is decreased, and it is also very difficult to produce a film without failure. From the viewpoint of increasing the reflectance and reducing the number of layers, there is no upper limit for the difference in the refractive index; however, substantially, the limit for the difference in the refractive index is about 1.4.

Regarding a preferred number of layers of the high refractive index layer and the low refractive index layer for the optical reflective film according to the present invention, from the viewpoint described above, the total number of layers is in the range of 100 layers or fewer, that is, 50 units or fewer; more preferably 40 layers (20 units) or fewer; even more preferably 30 layers (15 units) or fewer; and particularly preferably 10 layers (5 units) or fewer. Furthermore, the optical reflective film of the present invention may be configured such that at least one of the above-described unit is laminated, and for example, the optical reflective film may be a laminated film in which any of the outermost layer and the bottommost layer of the laminated film is formed from a high refractive index layer or a low refractive index layer. Regarding the optical reflective film according to the present invention, a layer configuration in which the bottommost layer adjacent to the base material is formed from a low refractive index layer, and the outermost layer is also formed from a low refractive index layer, is preferred.

The total thickness of the optical reflective film according to the present invention is preferably 12 μm to 315 μm, more preferably 15 μm to 200 μm, and even more preferably 20 μm to 100 μm. Furthermore, the thickness per layer of the low refractive index layer is preferably 20 to 800 nm, more preferably 50 to 350 nm, and even more preferably 100 to 200 nm. Meanwhile, the thickness per layer of the high refractive index layer is preferably 20 to 800 nm, more preferably 50 to 350 nm, and even more preferably 100 to 200 nm.

Furthermore, regarding the optical characteristics of the light reflective film according to the present invention, the transmittance for the visible light region according to JIS R3106: 1998 is preferably 50% or higher, more preferably 75% or higher, and even more preferably 85% or higher. Also, it is preferable that the light reflective film has a reflectance of higher than 50% in the wavelength region of 900 nm to 1,400 nm.

The optical film according to the present invention may have, underneath the base material or on the outermost surface layer on the opposite side of the base material, one or more of functional layers such as a conductive layer, an antistatic layer, a gas barrier layer, an easily adhesive layer (adhesive layer), an antifouling layer, a deodorizing layer, an anti-sticking layer, an easily lubricating layer, a hard coat layer, a wear-resistant layer, an antireflective layer, an electromagnetic wave shielding layer, an ultraviolet absorbing layer, an infrared absorbing layer, a print layer, a fluorescent light emitting layer, a hologram layer, a release layer, a pressure-sensitive adhesive layer, an adhesive layer, an infrared cutting layer other than the high refractive index layer and the low refractive index layer of the present invention (a metal layer or a liquid crystal layer), a colored layer (visible light absorbing layer), and an intermediate film layer utilized in laminated glasses, for the purpose of adding further functions.

A preferred embodiment of the present invention is an optical film produced by the method for producing an optical film.

[Applications]

A preferred embodiment of the present invention is an optical laminate in which an optical film is provided on at least one surface of a base. Particularly, it is preferable that the optical laminate is an optical reflector in which the optical film is an optical reflective film, and more particularly an infrared shielding body in which the optical film is an infrared shielding film.

Specific examples of the base include, but are not particularly limited to, for example, glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenolic resin, a diallyl phthalate resin, a polyimide resin, a urethane resin, a polyvinyl acetate resin, a polyvinyl alcohol resin, a styrene resin, a vinyl chloride resin, a metal plate, and ceramics. The type of the resin is not particularly limited, and any of a thermoplastic resin, a thermosetting resin, and an ionizing radiation-curable resin may be employed, or two or more kinds of these may also be used in combination. Regarding the base that can be used according to an embodiment of the present invention, a base produced by a known method such as extrusion molding, calender molding, injection molding, hollow molding, or compression molding, can be used. The thickness of the base is not particularly limited, but the thickness is preferably 0.1 mm to 5 cm.

When the optical film is an optical reflective film, it is preferable that the adhesive layer or pressure-sensitive adhesive layer for bonding the optical reflective film and the base is provided on the light (for example, light rays or heat rays)-incident surface side of the optical reflective film. Furthermore, it is preferable that an infrared shielding film, which is one type of optical reflective film, is sandwiched between a windowpane and a base, since the infrared shielding film can be sealed and thereby have excellent durability against gas in the surroundings, such as moisture. It is preferable to provide an infrared shielding film, which is one type of optical reflective film, outdoors or on the outer side of a car (for external attachment) from the viewpoint of environmental durability.

Regarding the adhesive or pressure-sensitive adhesive that is applicable according to an embodiment of the present invention, for example, an adhesive or pressure-sensitive adhesive containing a photocurable resin or a thermosetting resin as a main component can be used.

There are no particular limitations on the adhesive or pressure-sensitive adhesive; however, an adhesive or pressure-sensitive adhesive having durability against ultraviolet radiation is preferred. An acrylic adhesive or pressure-sensitive adhesive, or a silicone-based adhesive or pressure-sensitive adhesive is more preferred, and from the viewpoints of pressure-sensitive adhesion characteristics and cost, an acrylic adhesive or pressure-sensitive adhesive is even more preferred. Furthermore, from the viewpoint that the control of peeling force is easy, a solvent-based adhesive or pressure-sensitive adhesive among acrylic adhesives or pressure-sensitive adhesives is particularly preferred. In the case of using a solution polymerized polymer as an acrylic solvent-based adhesive or pressure-sensitive adhesive, known compounds can be used as the monomers for the polymer.

It is also acceptable to use a polyvinyl butyral-based resin or an ethylene-vinyl acetate copolymer-based resin, which are used as intermediate layers of laminated glasses, as the adhesive or pressure-sensitive adhesive. There are no particular limitations on the specific examples of the polyvinyl butyral-based resin or the ethylene-vinyl acetate copolymer-based resin, and examples include plastic polyvinyl butyrals (products manufactured by Sekisui Chemical Co., Ltd., products manufactured by Mitsubishi Monsanto Chemical Co., Ltd., and the like), ethylene-vinyl acetate copolymers (products manufactured by DuPont Company, and products manufactured by Takeda Pharmaceutical Co., Ltd. (DURAMINE)), and modified ethylene-vinyl acetate copolymers (manufactured by Tosoh Corp. (MELTHENE (registered trademark) G).

In the adhesive layer or pressure-sensitive adhesive layer, an ultraviolet absorber, an antioxidant, an antistatic agent, a thermal stabilizer, a lubricating agent, a filler, a colorant, an adhesion adjusting agent, and the like may be added and mixed as appropriate.

The thermal insulation performance and solar heat shielding performance of an infrared shielding film, which is one type of optical film, or an optical reflector (infrared shielding body), which is one type of optical laminate, can be generally determined by methods according to JIS R3209 (multilayer glass), JIS R3106 (testing method on transmittance, reflectance, emittance, and solar heat gain coefficient of flat glasses), and JIS R3107 (Evaluation on thermal resistance of flat glasses and thermal transmittance of glazing). Measurement of solar transmittance, solar reflectance, emittance, visible light transmittance is carried out as follows: (1) The spectral transmittance and spectral reflectance of various plate glasses are measured using a spectrophotometer for a wavelength range (300 to 2,500 nm). Emittance is measured using a spectrophotometer for a wavelength range of 5.5 to 50 μm. Meanwhile, for the emittance of float plate glass, polished plate glass, figured glass, and heat absorbing plate glass, default values are used. (2) Regarding the calculation of solar transmittance, solar reflectance, solar absorptance, and corrected emittance, the solar transmittance, solar reflectance, solar absorptance, and normal emittance are calculated according to JIS R3106. The corrected emittance is determined by multiplying the normal emittance by the coefficient disclosed in JIS R3107. Calculation of thermal insulation properties and solar heat shielding property is carried out as follows. (1) Heat resistance of a multilayer glass is calculated according to JIS R3209 using the measured value of thickness and the corrected emittance. However, in a case in which the thickness of a hollow layer is more than 2 mm, the base thermal conductance of the hollow layer is determined according to JIS R3107. (2) The resistance of heat transmission is determined by adding heat transfer resistance to the heat resistance of an insulating multilayer glass. (3) The solar heat shielding property is calculated by determining the solar heat gain coefficient according to JIS R3106, and subtracting the value from 1.

Furthermore, in a case in which the optical film is a thin film, the optical film can be preferably applied to the surface of display panels. As an example of such applications, for example, a product obtained by bonding an infrared shielding film with a highly transparent PET film may be applied to the display screen of a plasma display panel. By using an infrared shielding film according to such an application, the infrared radiation emitted from a plasma display panel can be shielded, and this can contribute to protection of human body, prevention of malfunction between electronic devices, prevention of malfunction of remote controllers, and the like.

Examples

Hereinafter, the present invention will be described in more detail by way of Examples; however, the present invention is not intended to be limited to these Examples. When the description of "parts" or "percent (%)" is used in the Examples, this means "parts by mass" or "percent (%) by mass", unless particularly stated otherwise.

[Preparation of Coating Liquid for Low Refractive Index Layer]

38 parts by mass of a colloidal silica (SNOWTEX (registered trademark) OXS, manufactured by Nissan Chemical Industries, Ltd., solid content: 10% by mass) was heated to 45° C., 3 parts by mass of a 3 mass % aqueous solution of boric acid was added thereto, and the mixture was stirred. 39 parts by mass of a 6 mass % aqueous solution of polyvinyl alcohol (JP-45, degree of polymerization: 4,500, degree of saponification: 87 mol %, manufactured by Japan Vam & Poval Co., Ltd.), which is a water-soluble polymer, and 1 part by mass of a 5 mass % aqueous solution of a surfactant (SOFTAZOLINE LSB-R, manufactured by Kawaken Fine Chemicals Co., Ltd.) were further added to the mixture in this order at 45° C., and the mixture was stirred. Thus, coating liquid 1 for a low refractive index layer was prepared.

[Loss Modulus Checking Step]

The loss modulus (G") of the coating liquid 1 for a low refractive index layer prepared as described above was measured using a rheometer (Rheo Stress 6000 (manufactured by Thermo Scientific, Inc.)) under the conditions described below.

Apparatus: Rhea Stress 6000 (manufactured by Thermo Scientific, Inc.)
Sensor system: cone-plate (cone radius: 60 mm, cone angle=) 1°
Shear stress: 0.5 Pa
Measurement frequency: 1 Hz
Measurement time: 60 minutes
Measurement temperature: 35° C.
Sample amount: 1 mL First, the value of loss modulus G"(0) at a measurement time of 0 minutes as the time of initiating measurement, was checked. Subsequently, measurement was continuously performed, and the value of loss modulus G" (60) at a measurement time of 60 minutes was checked. The time variation of the loss modulus (ΔG") was calculated by the following Equation 1 from the values of G" (0) and G" (60) thus obtained, and the time variation of the loss modulus (ΔG") of the coating liquid 1 for a low refractive index layer was 3.8.

$$\Delta G''=G''(60)-G''(0) \quad \text{(Equation 1)}$$

[Loss Modulus Adjusting Step]

The coating liquid 1 for a low refractive index layer was transported to MILDER MDN303V (manufactured by Pacific Machinery & Engineering Co., Ltd.), which is a dispersing apparatus, at a flow rate of 1.0 (L/min) using a rotary pump, and the coating liquid was dispersed therein by subjecting the coating liquid to a shear treatment at a temperature of 45° C. and a shear rate of $8.38 \times 10^4$ (1/sec). Thus, coating liquid 2 for a low refractive index layer was prepared. The time variation of the loss modulus (ΔG") was calculated in the same manner as in the case of the coating liquid 1 for a low refractive index layer, and the time variation of the loss modulus (ΔG") of the coating liquid 1 for a low refractive index layer was 0.5.

Furthermore, coating liquids 3 to 9 for a low refractive index layer were prepared in the same manner, except that the shear stress of the dispersing apparatus and the flow rate of the rotary pump used in the loss modulus adjusting step for the coating liquid 2 for a low refractive index layer were changed to the values described in the following Table 1. Also, coating liquid 10 for a low refractive index layer was prepared in the same manner, except that the polyvinyl alcohol used for the preparation of the coating liquid 4 for a low refractive index layer was changed from JP-45 (degree of polymerization: 4,500, degree of saponification: 87 mol %, manufactured by Japan Vam & Poval Co., Ltd.) to PVA-224 (degree of polymerization: 2,400, degree of saponification: 87 mol %, manufactured by Kuraray Co., Ltd.).

Coating liquid 11 for a low refractive index layer was also prepared in the same manner, except that the amount of the 3 mass % aqueous solution of boric acid used for the preparation of the coating liquid 4 for a low refractive index layer was changed from 3 parts by mass to 2 parts by mass.

These time variations of the loss modulus (ΔG") are described in the following Table 1.

[Preparation of Coating Liquid for High Refractive Index Layer]

(Preparation of Silica-Attached Titanium Dioxide Sol)

2 parts by mass of pure water was added to 0.5 parts by mass of a 15.0 mass % titanium oxide sol (SRD-W, average particle size: 5 nm, rutile type titanium dioxide particles, manufactured by Sakai Chemical Industry Co., Ltd.), and then the mixture was heated to 90° C. Next, 0.5 parts by mass of an aqueous solution of silicic acid (product obtained by diluting Sodium Silicate No. 4 (manufactured by Nippon Chemical Industrial Co., Ltd.) with pure water such that the $SiO_2$ concentration would be 0.5% by mass) was slowly added thereto. Next, the mixture was subjected to a heating treatment at 175° C. for 18 hours in an autoclave, and the mixture was cooled and then concentrated using an ultrafiltration membrane. Thus, a titanium dioxide sol having $SiO_2$ at a solid content concentration of 6% by mass attached to the surface (hereinafter, also simply referred to as "silica-attached titanium dioxide sol") was obtained.

(Preparation of Coating Liquid for High Refractive Index Layer)

To 140 parts by mass of the silica-attached titanium dioxide sol (solid content: 20.0% by mass) obtained as described above, was added 48 parts by mass of a 1.92 mass % aqueous solution of citric acid, and 113 parts by mass of a 8 mass % aqueous solution of a polyvinyl alcohol (PVA- 135, degree of polymerization: 3,500, degree of saponification: 98 mol %, manufactured by Kuraray Co., Ltd.) was added thereto. The mixture was stirred. Subsequently, 0.4 parts by mass of a 5 mass % aqueous solution of a surfactant (SOFTAZOLINE LSB-R, manufactured by Kawaken Fine Chemicals Co., Ltd.) was added thereto, and the mixture was stirred. Thus, coating liquid 1 for a high refractive index layer was prepared.

[Loss Modulus Checking Step]

The loss modulus (G") of the coating liquid 1 for a high refractive index layer prepared as described above was measured by the same method as that used in the loss modulus checking step for the preparation of the coating liquid 1 for a low refractive index layer. The time variation of the loss modulus (ΔG") of the coating liquid 1 for a high refractive index layer was 3.2.

[Loss Modulus Adjusting Step]

The coating liquid 1 for a high refractive index layer was dispersed by the same method and same conditions as those used in the loss modulus adjusting step for the preparation of the coating liquid 2 for a low refractive index layer, and thus coating liquid 2 for a high refractive index layer was prepared. Subsequently, the time variation of the loss modulus (ΔG") was determined again in the loss modulus checking step, and the time variation of the loss modulus (ΔG") of the coating liquid 2 for a high refractive index layer was 0.4.

Furthermore, coating liquids 3 to 7 for a high refractive index layer were prepared in the same manner, except that the shear stress of the dispersing machine and the flow rate of the rotary pump used for the loss modulus adjusting step for the coating liquid 2 for a high refractive index layer were changed to the values described in the following Table 2. Also, coating liquid 8 for a high refractive index layer was prepared in the same manner, except that the polyvinyl alcohol used for the preparation of the coating liquid 5 for a high refractive index layer was changed from PVA-135 (degree of polymerization: 3,500, degree of saponification: 98 mol %, manufactured by Kuraray Co., Ltd.) to PVA-124 (degree of polymerization: 2,400, degree of saponification: 98 mol %, manufactured by Kuraray Co., Ltd.).

Coating liquid 9 for a high refractive index layer was also prepared in the same manner, except that the amount of the 1.92 mass % aqueous solution of citric acid used for the preparation of the coating liquid 5 for a low refractive index layer was changed from 48 parts by mass to 60 parts by mass.

These time variations of the loss modulus (ΔG") are described in Table 2.

TABLE 1

| No. of coating liquid for low refractive index layer | Dispersing conditions | | | | |
|---|---|---|---|---|---|
| | Speed of rotation [rpm] | Shear speed [1/sec] | Pump flow rate [L/min] | Retention time [sec] | ΔG" |
| 1 | 0 | 0 | 0 | 0 | 3.8 |
| 2 | 8000 | $8.38 \times 10^4$ | 1.0 | 2.7 | 0.5 |
| 3 | 6000 | $6.28 \times 10^4$ | 1.0 | 2.7 | 1.2 |
| 4 | 3000 | $3.14 \times 10^4$ | 1.0 | 2.7 | 2.1 |
| 5 | 2000 | $2.10 \times 10^4$ | 1.0 | 2.7 | 2.9 |
| 6 | 1500 | $1.57 \times 10^4$ | 1.0 | 2.7 | 3.5 |
| 7 | 8000 | $8.38 \times 10^4$ | 0.5 | 5.4 | 0.4 |
| 8 | 8000 | $8.38 \times 10^4$ | 0.2 | 13.5 | 0.2 |
| 9 | 12000 | $1.26 \times 10^5$ | 0.1 | 27 | 0.1 |
| 10 | 3000 | $3.14 \times 10^4$ | 1.0 | 2.7 | 1.2 |
| 11 | 3000 | $3.14 \times 10^4$ | 1.0 | 2.7 | 1.5 |

TABLE 2

| No. of coating liquid for high refractive index layer | Dispersing conditions | | | | |
|---|---|---|---|---|---|
| | Speed of rotation [rpm] | Shear speed [1/sec] | Pump flow rate [L/min] | Retention time [sec] | ΔG" |
| 1 | 0 | 0 | 0 | 0 | 3.2 |
| 2 | 8000 | $8.38 \times 10^4$ | 1.0 | 2.7 | 0.4 |
| 3 | 6000 | $6.28 \times 10^4$ | 1.0 | 2.7 | 0.8 |
| 4 | 3000 | $3.14 \times 10^4$ | 1.0 | 2.7 | 1.3 |
| 5 | 2000 | $2.10 \times 10^4$ | 1.0 | 2.7 | 2.7 |
| 6 | 8000 | $8.38 \times 10^4$ | 0.5 | 5.4 | 0.2 |
| 7 | 8000 | $8.38 \times 10^4$ | 0.2 | 13.5 | 0.1 |
| 8 | 2000 | $2.10 \times 10^4$ | 1.0 | 2.7 | 1.5 |
| 9 | 2000 | $2.10 \times 10^4$ | 1.0 | 2.7 | 1.8 |

[Coating Application Step]

In parallel to the modulus checking step described above, coating application was performed using the coating liquid 1 for a high refractive index layer and the coating liquid 1 for a low refractive index layer. That is, coating application was performed using a coating liquid in the same state as the state at the time of initiating measurement of the time variation of the loss modulus (ΔG") as described above. More specifically, apart from the coating liquid itself used in the loss modulus checking step, a fresh coating liquid in the same state as the state at the time of initiating measurement (measurement time: 0 minutes) of the time variation of the loss modulus (ΔG") was prepared, the fresh coating liquid having the same formulation as the coating liquid with which measurement of the time variation of the loss modulus (ΔG") was performed, and having been subjected to the lapse of the same period of time as the time taken from the preparation of the coating liquid to the initiation of measurement of the time variation of the loss modulus (ΔG"). Coating application was performed using this.

A slide hopper coating apparatus capable of 9-layer multilayer coating application was used as the coating apparatus. While the coating liquid 1 for a high refractive index layer and the coating liquid 1 for a low refractive index layer were kept warm at 40° C., simultaneous multilayer coating application of 9 layers in total was performed on a polyethylene terephthalate (PET) film (manufactured by Toyobo Co., Ltd., COSMOSHINE (registered trademark) A4300, double-sided easily adhesive layer) having a width of 300 mm and a thickness of 50 μm and warmed to 40° C., such that low refractive index layers and high refractive index layers were respectively alternately disposed, with the bottommost layer and the topmost layer being low refractive index layers, and the average film thickness after drying would be 150 nm for each of the low refractive index layers, and 130 nm for each of the high refractive index layers. Immediately after coating application, the laminate was set by blowing cold air at 10° C. At this time, the time taken until, when the surface was touched with a finger, nothing stuck to the finger (setting time) was 10 seconds. After completion of setting, the laminate was dried by blowing warm air at 60° C., and thereby an infrared shielding film of Comparative Example 1 including 9 layers in total was produced.

Furthermore, infrared shielding films of Examples 1 to 16 and Comparative Examples 2 to 4 were produced in the same manner, except that the coating liquid for a high refractive index layer and the coating liquid for a low refractive index layer used in the coating application step for the infrared shielding film of Comparative Example 1, to the combinations described in the following Table 3.

[Evaluation of Optical Film (Infrared Shielding Film)]
(Checking of Coating Failure by Visual Inspection)

For each of the infrared shielding films produced as described above, an area having a length of 10 m×a width of 0.25 m was checked by visual inspection, and the number of tailings and streaks was checked by visual inspection. The value was divided by 2.5, and thereby the average number of coating failures per 1 m×1 m was calculated. Here, when the rating was A or higher (average number of failures was 1.0 piece/m² or less), this indicates that the infrared shielding film has practically usable characteristics.

⊙: 0 pieces/m²
○: More than 0 to 0.1 pieces/m²
Δ: More than 0.1 to 1.0 piece/m²
x: More than 1.0 to 10 pieces/m²
xx: More than 10 pieces/m²

TABLE 3

| | Coating liquid for high refractive index layer | | Coating liquid for low refractive index layer | | Failure of coating |
|---|---|---|---|---|---|
| | No. | ΔG" | No. | ΔG" | |
| Example 1 | 2 | 0.4 | 2 | 0.5 | ⊙ |
| Example 2 | 2 | 0.4 | 3 | 1.2 | ○ |
| Example 3 | 2 | 0.4 | 4 | 2.1 | Δ |
| Example 4 | 2 | 0.4 | 5 | 2.9 | Δ |
| Example 5 | 2 | 0.4 | 7 | 0.4 | ⊙ |
| Example 6 | 2 | 0.4 | 8 | 0.2 | ⊙ |
| Example 7 | 3 | 0.8 | 7 | 0.4 | ⊙ |
| Example 8 | 4 | 1.3 | 7 | 0.4 | ○ |
| Example 9 | 5 | 2.7 | 7 | 0.4 | Δ |
| Example 10 | 6 | 0.2 | 7 | 0.4 | ⊙ |
| Example 11 | 7 | 0.1 | 9 | 0.1 | ⊙ |
| Example 12 | 5 | 2.7 | 5 | 2.9 | Δ |
| Example 13 | 2 | 0.4 | 10 | 1.2 | ○ |
| Example 14 | 2 | 0.4 | 11 | 1.5 | ○ |
| Example 15 | 8 | 1.5 | 7 | 0.4 | ○ |
| Example 16 | 9 | 1.8 | 7 | 0.4 | ○ |
| Comparative Example 1 | 1 | 3.2 | 1 | 3.8 | XX |
| Comparative Example 2 | 1 | 3.2 | 7 | 0.4 | X |
| Comparative Example 3 | 1 | 3.2 | 6 | 3.5 | X |
| Comparative Example 4 | 2 | 0.4 | 1 | 3.8 | X |

As is obvious from the results of Table 3 shown above, regarding the infrared shielding films of Examples 1 to 16 produced by a production method of performing simultaneous multilayer coating application of a coating liquid for a low refractive index layer and a coating liquid for a high refractive index layer, which had been subjected to a loss modulus checking step and were found to have a time variation of the loss modulus (ΔG") of 3.0 or less, it was confirmed that these films had fewer tailings and streaks, which are coating failures, and satisfactory film quality.

In regard to Examples 1 to 16, the coating liquid for a low refractive index layer contained boric acid as a crosslinking component. Here, in a coating liquid containing a crosslinking component, since a crosslinking reaction progresses in the coating liquid as time elapses, generally, aggregates are more easily generated, and the sizes of the aggregates are also larger, compared to systems that do not contain a crosslinking component. However, although the coating liquids contained crosslinking components, the infrared shielding films of Examples 1 to 16 had satisfactory film quality. Therefore, it was confirmed that the present invention is particularly useful for coating liquids containing crosslinking components.

Here, it was confirmed from a comparison between Example 3 and Example 14 that when the amount of boric acid in the coating liquid is decreased, the value of ΔG" becomes smaller even under the same dispersing conditions, and the incidence of coating failure is reduced.

It was confirmed from a comparison between Example 9 and Example 16 that when the amount of citric acid in the coating liquid is increased, the value of ΔG" becomes smaller even under the same dispersing conditions, and the incidence of coating failure is reduced.

Furthermore, from a comparison between Example 3 and Example 13 and a comparison between Example 9 and Example 15, it was confirmed that when the degree of polymerization of the polyvinyl alcohol in the coating liquid is smaller, the value of ΔG" becomes smaller even under the same dispersing conditions, and the incidence of coating failure is reduced.

Comparative Examples 1 to 4 are such that the time variation of the loss modulus (ΔG") of at least one of the coating liquid for a low refractive index layer and the coating liquid for a high refractive index layer is not included in the scope of the present invention, and in such a case, the frequency of occurrence of coating failure was high. From this, it is speculated that tailings and streaks, which are coating failures, are generated at the time of forming respective layers that are formed by simultaneous multilayer coating application, and since it is necessary to suppress aggregation occurring in the respective layers in order to ameliorate the coating failure, consequently noticeable effects were obtained by adjusting the time variations of the loss modulus (ΔG") of all the layers formed by simultaneous multilayer coating application to be within the scope of the present invention.

Furthermore, in Example 1, coating application was performed using a coating liquid in a state in which the time point of initiation of coating application in the coating application step had been delayed by 30 minutes from the time of initiating measurement (measurement time: 0 minutes) of the time variation of the loss modulus (ΔG"). More specifically, apart from the coating liquid itself used in the loss modulus checking step, a fresh coating liquid in the same state as the state at the time of initiating measurement (measurement time: 0 minutes) of the time variation of the loss modulus (ΔG") was prepared, the fresh coating liquid having the same formulation as the coating liquid with which measurement of the time variation of the loss modulus (ΔG") was performed, and having been subjected to the lapse of the same period of time as the time taken from the preparation of the coating liquid to the initiation of measurement of the time variation of the loss modulus (ΔG"). This was further left to stand for 30 minutes, and then coating application was performed using the resultant. At this time, the time taken from the time point of preparing the coating liquid in the same state as the state at the time of initiating measurement (measurement time: 0 minutes) of the time variation of the loss modulus (ΔG"), until the coating liquid after standing for 30 minutes was discharged from a coater and reached a film, was less than 60 minutes. As a result, it was confirmed that satisfactory results similar to those of Example 1 could be obtained.

[Production of Optical Laminate]

Infrared shielding bodies as optical laminates were produced using the respective infrared shielding films of Examples 1 to 16 produced as described above. Specifically, each of the infrared shielding films of Examples 1 to 16 was adhered onto a transparent acrylic resin plate having a thickness of 5 mm and a size of 20 cm×20 cm using an acrylic adhesive. Thus, corresponding optical laminates (infrared shielding bodies) 1 to 16 were produced.

[Evaluation of Optical Laminate]

It was confirmed that the optical laminates (infrared shielding bodies) 1 to 16 produced as described above exhibited excellent infrared shielding properties, utilizing the infrared shielding films of Examples 1 to 16 of the present invention as the optical laminates.

The present patent application is based on Japanese Patent Application No. 2014-239324 filed on Nov. 26, 2014, the disclosure of which is incorporated herein by reference.

The invention claimed is:

1. A method for producing an optical film having at least two or more optical functional layers formed on a base material, the method comprising:
   a loss modulus checking step of checking the loss moduli of coating liquids capable of forming the respective optical functional layers by measuring dynamic viscoelasticity; and
   a coating application step of performing simultaneous multilayer coating application of the coating liquids capable of forming the respective optical functional layers on the base material,
   wherein in the coating application step, coating application is performed when the time variations of the loss modulus ($\Delta G''$), as defined by the following Equation 1, of the coating liquids capable of forming the respective optical functional layers are 3.0 or less:

$$\Delta G'' = G''(60) - G''(0) \quad \text{(Equation 1)}$$

wherein G''(60) represents the value of loss modulus at a measurement time of 60 minutes; and G''(0) represents the value of loss modulus at a measurement time of 0 minutes.

2. The method for producing an optical film according to claim 1, further comprising, between the loss modulus checking step and the coating application step, a loss modulus adjusting step of taking at least a coating liquid having a time variation of the loss modulus ($\Delta G''$) of greater than 3.0 among the coating liquids capable of forming the respective optical functional layers, by dispersing the coating liquid, and thereby adjusting the time variation of the loss modulus ($\Delta G''$) of the coating liquid to be 3.0 or less.

3. The method for producing an optical film according to claims wherein at least one of the coating liquids capable of forming the respective optical functional layers contains a crosslinking component.

4. The method for producing an optical film according to claim 1, wherein at least one of the coating liquids capable of forming the respective optical functional layers contains a polymer and inorganic oxide particles.

5. The method for producing an optical film according to claim 1, wherein the optical functional layer includes high refractive index layers and low refractive index layers, and has a structure in which the high refractive index layers and the low refractive index layers are alternately laminated.

6. The method for producing an optical film according to claim 1, wherein the optical film is an optical reflective film.

7. The method for producing an optical film according to claim 6, wherein the optical reflective film is an infrared shielding film.

8. An optical film, produced by the production method according to claim 1.

9. An optical laminate, comprising the optical film according to claim 8 provided on at least one surface of a base.

* * * * *